(12) United States Patent
Carver et al.

(10) Patent No.: US 12,442,639 B2
(45) Date of Patent: Oct. 14, 2025

(54) METHOD AND SYSTEM FOR ROUTING/ORCHESTRATION/MANAGEMENT OF AERIAL VEHICLES OR DATA ON A NETWORK

(71) Applicant: AT&T Intellectual Property I, L.P., Atlanta, GA (US)

(72) Inventors: Paul Carver, Somerset, NJ (US); Abhigyan Sharma Abhigyan, Basking Ridge, NJ (US); John Craig, Ocean Township, NJ (US); Andrew Kell, Marietta, GA (US); James Pratt, Round Rock, TX (US); David Plunkett, Jr., Kennesaw, GA (US); James Carlton Bedingfield, Sr., Gainesville, GA (US); Michael Albrecht, Dallas, TX (US); Michael L. Hunter, Trenton, NJ (US); Virginia S. Ng, Lawrenceville, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 579 days.

(21) Appl. No.: 17/519,683

(22) Filed: Nov. 5, 2021

(65) Prior Publication Data
US 2023/0147814 A1    May 11, 2023

(51) Int. Cl.
| | | |
|---|---|---|
| G01C 21/20 | (2006.01) | |
| B60L 53/30 | (2019.01) | |
| G06F 9/54 | (2006.01) | |
| G08G 5/25 | (2025.01) | |
| G08G 5/32 | (2025.01) | |
| G08G 5/55 | (2025.01) | |

(Continued)

(52) U.S. Cl.
CPC .............. *G01C 21/20* (2013.01); *B60L 53/30* (2019.02); *G06F 9/547* (2013.01); *G08G 5/25* (2025.01); *G08G 5/32* (2025.01); *G08G 5/55* (2025.01); *G08G 5/57* (2025.01); *H04L 63/0428* (2013.01); *H04W 12/63* (2021.01); *B64U 50/34* (2023.01)

(58) Field of Classification Search
None
See application file for complete search history.

(56) References Cited

U.S. PATENT DOCUMENTS

| | | | | |
|---|---|---|---|---|
| 2015/0336669 | A1* | 11/2015 | Kantor | G01C 21/343 701/3 |
| 2016/0221688 | A1* | 8/2016 | Moore | F21V 33/00 |

(Continued)

*Primary Examiner* — Hongye Liang
(74) *Attorney, Agent, or Firm* — Guntin & Gust, PLC; Erik Boyd

(57) ABSTRACT

Aspects of the subject disclosure may include, for example, identifying an uncrewed aerial vehicle (UAV) for route planning and power management, obtaining information regarding the UAV, a present location of the UAV, a destination location for the UAV, or a combination thereof, determining, based on the information, a need for the UAV to recharge a power source of the UAV as part of a journey of the UAV from the present location of the UAV to the destination location for the UAV, responsive to the determining the need, identifying a recharging station associated with a network for recharging the power source of the UAV, and calculating a flight path for the UAV in accordance with the identifying the recharging station. Other embodiments are disclosed.

20 Claims, 10 Drawing Sheets

(51) Int. Cl.
*G08G 5/57* (2025.01)
*H04L 9/40* (2022.01)
*H04W 12/63* (2021.01)
B64U 50/34 (2023.01)

(56) References Cited

U.S. PATENT DOCUMENTS

2018/0229859 A1* 8/2018 Evans .................... H02J 50/90
2019/0047701 A1* 2/2019 Winkle .................. H02J 7/342
2020/0001735 A1* 1/2020 Cheng .................... G08G 5/76

* cited by examiner

METHOD AND SYSTEM FOR ROUTING/ORCHESTRATION/MANAGEMENT OF AERIAL VEHICLES OR DATA ON A NETWORK

FIELD OF THE DISCLOSURE

The subject disclosure relates to (e.g., autonomous) routing, orchestration, and/or management of uncrewed aerial vehicles (UAVs) and/or data on a network.

BACKGROUND

UAVs, or drones, are often utilized for remote inspections of sites and/or equipment (e.g., utility structures, cell towers, etc.). Presently, drones are transported over land in a vehicle (e.g., a truck), from a storage location to a target operating area, and subsequently launched or dispatched into operation by a human operator.

BRIEF DESCRIPTION OF THE DRAWINGS

Reference will now be made to the accompanying drawings, which are not necessarily drawn to scale, and wherein.

DETAILED DESCRIPTION

Figure 1:
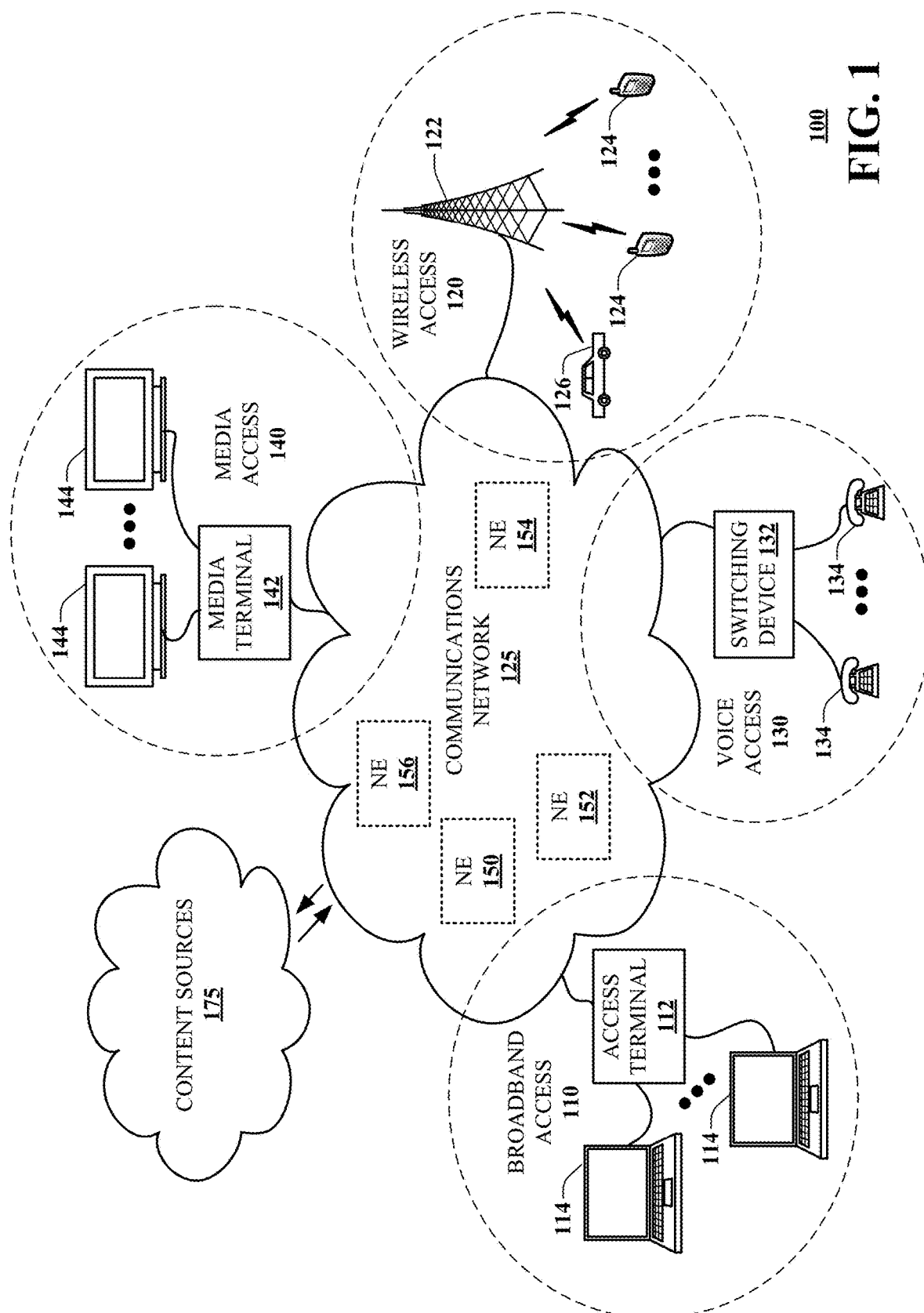
FIG. 1 is a block diagram illustrating an exemplary, non-limiting embodiment of a communications network in accordance with various aspects described herein.

The subject disclosure describes, among other things, illustrative embodiments for autonomous routing, orchestration, and/or management of UAVs and/or data on a network. Various embodiments provide for docking, charging, routing, and application programming interface (API) integration for autonomous UAV fleet management, as described herein. One or more embodiments provide for autonomous edge cloud management, where data at an edge compute device that is at risk of (or subject to) being compromised (e.g., in a disaster situation) can be transferred to, or synchronized with, other edge compute device(s), as described herein.

In exemplary embodiments, a system (e.g., a network system) may include a routing/orchestration platform that is configured to perform route planning and flight management for one or more fleets of UAVs, such as a network provider's own fleet(s) of drones and/or fleet(s) of drones associated with (e.g., owned or operated by) one or more third-party entities. The network provider may operate the system, which may include base stations distributed throughout geographic region(s) (thus forming a geographic footprint for the network provider), and a core network communicatively coupled to the base stations via edge systems—e.g., edge compute network(s)/devices, such as multiaccess edge compute (MEC) network(s), compute devices, or the like. For instance, a MEC may reside on-premise or proximate to a premises (e.g., within a threshold distance from a premises), and may include compute devices configured for application compute, and a multiaccess edge compute network (e.g., Hub device) communicatively coupled to the compute devices and configured to manage the compute devices so as to provide localized/on-premise compute. As used herein, edge system(s), network(s), and/or device(s) may refer to or include MEC network(s) and/or compute device(s).

In various embodiments, the system may include (e.g., a one-time installation of) a set of UAV docking/charging stations distributed or deployed throughout the network operator's geographic footprint, and configured to permit landing, recharging/stationing, and launching of UAVs across the geographic region(s) with minimal to no human assistance. One or more (e.g., each) of the docking/charging stations may reside at a secure location. In certain embodiments, one or more (e.g., each) of the docking/charging stations may be mounted on a cell tower. For example, a docking/charging station may be positioned proximate to antenna(s) at a tower top, but at a threshold distance from such antenna(s) so as to avoid subjecting the antenna(s) to interference from UAV movements. In other embodiments, one or more (e.g., each) of the docking/charging stations may be disposed in an area associated with the network provider, but at a position that is sufficiently far away (e.g., at a threshold distance) from the cell tower, antenna(s), and/or other base station equipment. This can reduce or eliminate the possibility of UAV interference with base station operations as well as the possibility of drone-related attacks, which may be difficult to detect and defend against in remote areas.

In various embodiments, one or more (e.g., each) of the docking/charging stations may include a weatherproof enclosure (e.g., against rain, snow, dust, or other external debris) with a remotely-operable ingress/egress mechanism—a cover, lid, door, gate, or the like—that can be controlled to permit an authorized UAV to enter the enclosure for stationing/recharging and to exit the enclosure, with minimal to no human interaction. In certain embodiments, a docking/charging station may be secured to a mounting structure with one or more locks or the like and/or may be positioned in a gated or fenced area to prevent theft or other undesired tampering of the stations and/or UAVs.

In one or more embodiments, the set of docking/charging stations may be configured, or standardized, for docking and/or charging of a variety of types of UAVs produced by various manufacturers. For example, one or more (e.g., each) of the docking/charging stations may be designed in accordance with a multi-vendor standard that allows UAVs of a variety of shapes, sizes, and/or capabilities to autonomously land in (or on) the docking/charging station and couple (or connect) to a power source for recharging, with minimal to no human assistance.

In exemplary embodiments, a standardized (e.g., add-on) power adapter device may be provided to interface a UAV and a power source of one or more (e.g., each) of the docking/charging stations. In various embodiments, the standardized power adapter device may include a first electrical connector configured to interface with a complementary electrical connector of a given UAV, and may detachably couple or mount to the UAV. In these embodiments, the power adapter device may include a second electrical connector configured to interface with a complementary electrical connector of a docking/charging station. In certain embodiments, the second electrical connector and the complementary electrical connector of a docking/charging station may be configured to magnetically attract, or couple to, one another, which can facilitate positioning/alignment of a UAV during landing in (or on) the docking/charging station. In this way, UAVs provided by different vendors may utilize the same docking/charging station interchangeably.

In some embodiments, one or more (e.g., each) of the docking/charging stations may additionally, or alternatively, be equipped with portable power sources (e.g., batteries) for various types of UAVs, and one or more mechanisms adapted to exchange a portable power source of a given UAV with a (e.g., fully) charged portable power source. In these embodiments, the mechanism(s) may be configured to identify (e.g., via image/object recognition) and release and remove (e.g., via one or more movable mechanical arms or magnetically-engaged contacts) a portable power source from a UAV and apply/install another portable power source to the UAV. Having the option of "battery swapping" in this way can allow for shorter docking/resting times for a UAV, thereby enabling longer in-field operation times.

In some embodiments, one or more (e.g., each) of the docking/charging stations may additionally, or alternatively, include a contactless (e.g., inductive) power source for recharging UAVs that are capable of contactless charging.

In exemplary embodiments, the routing/orchestration platform of the system may be configured with geographic routing algorithm(s) that are capable of performing route planning and flight management for UAVs from one location to another, such as from a storage/maintenance depot to a target operation area. In one or more embodiments, the geographic routing algorithm(s) may be capable of calculating/defining an optimal flight path or route for a UAV based on a shortest distance from one location to the next, based on information regarding obstacles, based on a determined/predicted number of stops for recharging in route from one location to the next, based on determined weather conditions, based on determined network coverage availability/connectivity of the UAV while in-flight, and/or the like. In certain embodiments, the geographic routing algorithm(s) may include one or more artificial intelligence (AI) algorithms capable of being trained (e.g., based on historical data, based on user input, and/or the like) to identify optimal flight paths, changes that need to be made to flight paths, and/or the like.

In various embodiments, the routing/orchestration platform may be configured to provide power management for UAVs. For example, the routing/orchestration platform may monitor the power status of a UAV, identify (e.g., based on the expected power needed to traverse certain distances along a flight path of the UAV, based on a monitored power level of the UAV falling below a threshold, or the like) docking/charging station(s) along the flight path at which the UAV may rest for recharging, cause the UAV to route to the identified docking/charging station(s), and/or provide for remote control of an ingress/egress mechanism (e.g., a mechanically-operated door, gate, top cover, or the like) of an identified docking/charging station to facilitate landing of the UAV onto, and/or taking off of the UAV from, a landing/launch platform therein. In certain embodiments, the routing/orchestration platform may be configured to control occupancy of a docking/charging station by coordinating a first UAV, which may, for example, be assigned to the docking/charging station as the first UAV's "home" location, to vacate the docking/charging station in order to allow a second, "guest" UAV to dock to, charge at, and depart from the docking/charging station prior to the first UAV returning thereto.

Autonomously facilitating recharging of a given UAV at one or more docking/charging stations along a route (e.g., recharge hops at cell towers along a flight path) enables the UAV to traverse longer distances than its power source may permit and thus operate across a wider geographic area than otherwise possible. This also enables UAVs to return, possibly via multiple recharging hops, to a maintenance depot for maintenance when needed, and facilitates replacement of UAVs due to age, availability of new features, etc.—e.g., by dispatching a UAV from a docking/charging station to a maintenance depot and dispatching of a replacement UAV from the maintenance depot to the docking/charging station.

In exemplary embodiments, aspects of the routing/orchestration platform may be application programming interface (API)-driven. In one or more embodiments, the API may enable external input of data/control commands associated with the abovementioned UAV route planning, flight management, and/or power management. The routing/orchestration platform may, therefore, be configured to enable a network provider to not only autonomously operate its own fleet of UAVs, but to also facilitate external use of the system for third-party fleet(s) (e.g., via server services or the like). A third-party entity (e.g., vendor) may, for example, through advanced registration/reservation with the network provider, leverage (e.g., via a third-party UAV management system) the routing/orchestration platform's UAV route planning and flight management functionalities as well as overall power management functionalities, including by submitting requests for, and utilizing, the various docking/charging stations for UAV recharging purposes. In certain embodiments, the routing/orchestration platform may be accessible via the API for (e.g., software-based) control of the opening and closing of docking/charging station enclosures for landing/launching of UAVs. In some embodiments, the routing/orchestration platform may be configured to orchestrate, for a given UAV, knowledge of a type of the UAV, capabilities of the UAV, locations and occupancy statuses of docking/charging station(s) accessible to the UAV, and/or the like, utilize this information to process third-party requests for UAV recharging, provide location information (e.g., global positioning system (GPS) coordinates) of available docking/charging station(s), provide access information on how to communicate with the docking/charging station(s), and/or facilitate physical access to (e.g., opening/closing of) the docking/charging station(s). For instance, in certain embodiments, a docking/charging station may include a communication and control system with which a UAV may communicate via a wireless communication protocol. In these embodiments, a (e.g., third-party) UAV may, using the abovementioned access information, communicate with a docking/charging station to authenticate the UAV and control opening of the docking/charging station for landing and recharging. In alternate embodiments, the routing/orchestration platform may, based upon monitoring the location of a UAV, control opening of the docking/charging station when the UAV is determined to be proximate to (e.g., within a threshold distance from) the docking/charging station. In various embodiments, the routing/orchestration platform may implement encryption/authentication measures to validate third-party UAVs prior to permitting access to the routing/orchestration platform's functionalities via the API, which can prevent unauthorized UAVs from utilizing the various docking/charging stations. In some embodiments, the routing/orchestration platform and/or the docking/charging station may receive, from the UAV, an API request that includes the abovementioned access information and/or network data, such as unique radio equipment identifier(s) (e.g., an identifier associated with a base station receiving the API request/radio signal), data regarding signal measurements, and/or the like, and may process the API request based on the access information and/or the network data to determine whether to grant the UAV access to the docking/charging station. In this way, if a first docking/charging station is initially arranged to accommodate the UAV, and the UAV provides an API request that includes, for example, GPS coordinates near or associated with an associated first base station, but the radio signal for the API request is instead received at a second base station, then the routing/orchestration platform and/or the first docking/charging station may deny the API request or may perform additional approval processing (e.g., by facilitating arrangement of a second docking/charging station, associated with the second base station, to accommodate the UAV).

In exemplary embodiments, the routing/orchestration platform may include billing functions configured to charge for third-party use of the docking/charging station(s) and/or functionalities of the routing/orchestration platform. In various embodiments, for example, the routing/orchestration platform may bill a third party based on each use of a docking/charging station, based on a duration of each use of a docking/charging station, based on a quantity of the third-party's UAVs in operation and in need of recharging, based on a preset number of uses of one or more docking/charging stations (e.g., as part of a recharging package or plan), and/or the like.

Providing a network of UAV docking/charging station(s) that are secured and mounted in outdoor areas associated with a network operator, and that are software-controllable and standardized—e.g., with physical hardware, including electrically-powered recharging sources and associated interfaces/connectors—to accommodate a variety of commercial UAVs (and not restricted, or limited, to specific UAV brand(s) or model(s)), enables the operation of a distributed, multi-vendor fleet of diverse UAVs over a large geographic footprint, with minimal to no need for "on location" human support. As UAVs are increasingly being deployed in various operations, such as in-field equipment (e.g., cell tower, utility pole, etc.) inspections, public assistance missions, emergency situations, and/or disaster recovery purposes, providing a network of docking/charging station(s) and functionality for routing/orchestration/management of UAV flight and power eliminates or reduces a need for human operator(s) to manually transport UAVs to target areas, dispatch the UAVs, be physically present while operating the UAVs, and retrieve and return the UAVs for recharging. This reduces the costs of, and enhances, those operations, allowing for (e.g., fully) autonomous UAV operations as well as fleet distribution even to the edge(s) of a network.

Facilitating fully autonomous UAV operations, as described herein, also allows for rapid responses in disaster situations, as UAVs may be automatically dispatched from undamaged or unaffected docking/charging stations proximate to (e.g., around a perimeter of) a disaster area for surveillance and data gathering. In various embodiments, the routing/orchestration platform may identify docking/charging station(s) that are still functional, selectively communicate with affected edge systems for load distribution or redistribution, and/or the like. This can facilitate data transfer to edge systems located in other unaffected (or less-affected) areas and/or enable UAVs to be re-routed to functional docking/charging station(s), which allows data to be preserved and/or an optimal number of UAVs to remain in operation to assist in disaster recovery efforts.

Lowering the cost of UAV deployment also permits a network operator to offer a variety of automated services, such as surveillance or the like. For example, the network operator may provide drone-based inspection services to utility providers for inspection of power lines, local governments for inspection of roads, emergency services for advanced inspection of traffic accidents or fires, and/or the like.

In certain embodiments, the network provider may, by virtue of having access to location information of UAVs communicatively coupled to the provider's network, provide a service to third parties for UAV recovery—e.g., a "find my drone" service that assists with finding a drone that may have malfunctioned (e.g., due to collision, power loss, or the like) and a connection between the UAV and a third-party operator of the UAV has been lost. In these embodiments, for example, the network system can, based upon receiving a request from the third-party operator to locate the UAV, determine a last known location of the UAV (e.g., the last known cell tower to which the UAV was connected) and provide information regarding this last known location to the third-party operator to assist in recovery efforts. This service may be implemented in the routing/orchestration platform, or alternatively, may be independent from the routing/orchestration platform's functionalities.

In certain embodiments, the network provider may provide a UAV service in which a third party can access and utilize a portion, or all, of the network provider's own fleet of UAVs for the third party's purposes. For instance, the network provider may provide a "first person view" of a UAV to a third party that desires to leverage the provider's UAV to conduct in-field operations, such as inspection of equipment (e.g., utility poles, water towers, etc.) or the like. In this way, the third party may not need to obtain aviation licenses, acquire UAVs, train UAV operators, etc., and can simply leverage the network provider's trained UAV operators and/or the routing/orchestration platform and docking/charging stations described herein (e.g., in a case where such platform and stations are employed by the network provider) to carry out UAV missions, all while being able to monitor/view/access video or other data collected/provided by the UAV(s).

One or more aspects of the subject disclosure include a device, comprising a processing system of a network including a processor, and a memory that stores executable instructions that, when executed by the processing system, facilitate performance of operations. The operations can include identifying an uncrewed aerial vehicle (UAV) for route planning and power management. Further, the operations can include obtaining information regarding the UAV, a present location of the UAV, a destination location for the UAV, or a combination thereof. Further, the operations can include determining, based on the information, a need for the UAV to recharge a power source of the UAV as part of a journey of the UAV from the present location of the UAV to the destination location for the UAV. Further, the operations can include, responsive to the determining the need, identifying a recharging station associated with the network for recharging the power source of the UAV. Further, the operations can include calculating a flight path for the UAV in accordance with the identifying the recharging station.

One or more aspects of the subject disclosure include a non-transitory machine-readable medium, comprising executable instructions that, when executed by a processing system including a processor and associated with a plurality of edge compute devices of a network, facilitate performance of operations. The operations can include receiving information indicating that data stored in a first edge compute device of the plurality of edge compute devices is at risk of being lost or compromised, wherein the information is provided by a sensor associated with the first edge compute device or by a source external to the network, and wherein the information relates to a potential disaster situation in a geographic region associated with the first edge compute device or a potential malicious attack associated with the first edge compute device. Further, the operations can include, responsive to the receiving the information, identifying a second edge compute device of the plurality of edge compute devices to which a portion of the data is to be transferred. Further, the operations can include, based on the identifying the second edge compute device, causing the portion of the data to be transferred to the second edge compute device, thereby safeguarding the portion of the data on the network.

One or more aspects of the subject disclosure include a method. The method can comprise obtaining, by a processing system including a processor, and from a third-party drone management system, data relating to a plurality of flight plans for a plurality of uncrewed aerial vehicles (UAVs), wherein the processing system is associated with a set of drone charging stations of a network. Further, the method can include predicting, by the processing system, that a first UAV of the plurality of UAVs, associated with a first flight plan of the plurality of flight plans, will require recharging prior to arriving at a destination location identified in the first flight plan. Further, the method can include arranging, by the processing system, for a first drone charging station of the set of drone charging stations to accommodate for the recharging of the first UAV, wherein the arranging comprises causing authentication information for accessing the first drone charging station to be provided to the third-party drone management system or to the first UAV, or causing, based on detecting that the first UAV is within a threshold distance from the first drone charging station, the first drone charging station to become accessible to the first UAV for the recharging. Further, the method can include applying, by the processing system, a charge to an account relating to the third-party drone management system in accordance with the arranging for the first drone charging station to accommodate the first UAV.

Other embodiments are described in the subject disclosure.

Referring now to FIG. 1, a block diagram is shown illustrating an example, non-limiting embodiment of a system 100 in accordance with various aspects described herein. For example, system 100 can facilitate, in whole or in part, autonomous routing, orchestration, and/or management of UAVs and/or data on a network (e.g., as described herein with respect to at least FIG. 2A). In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communications network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
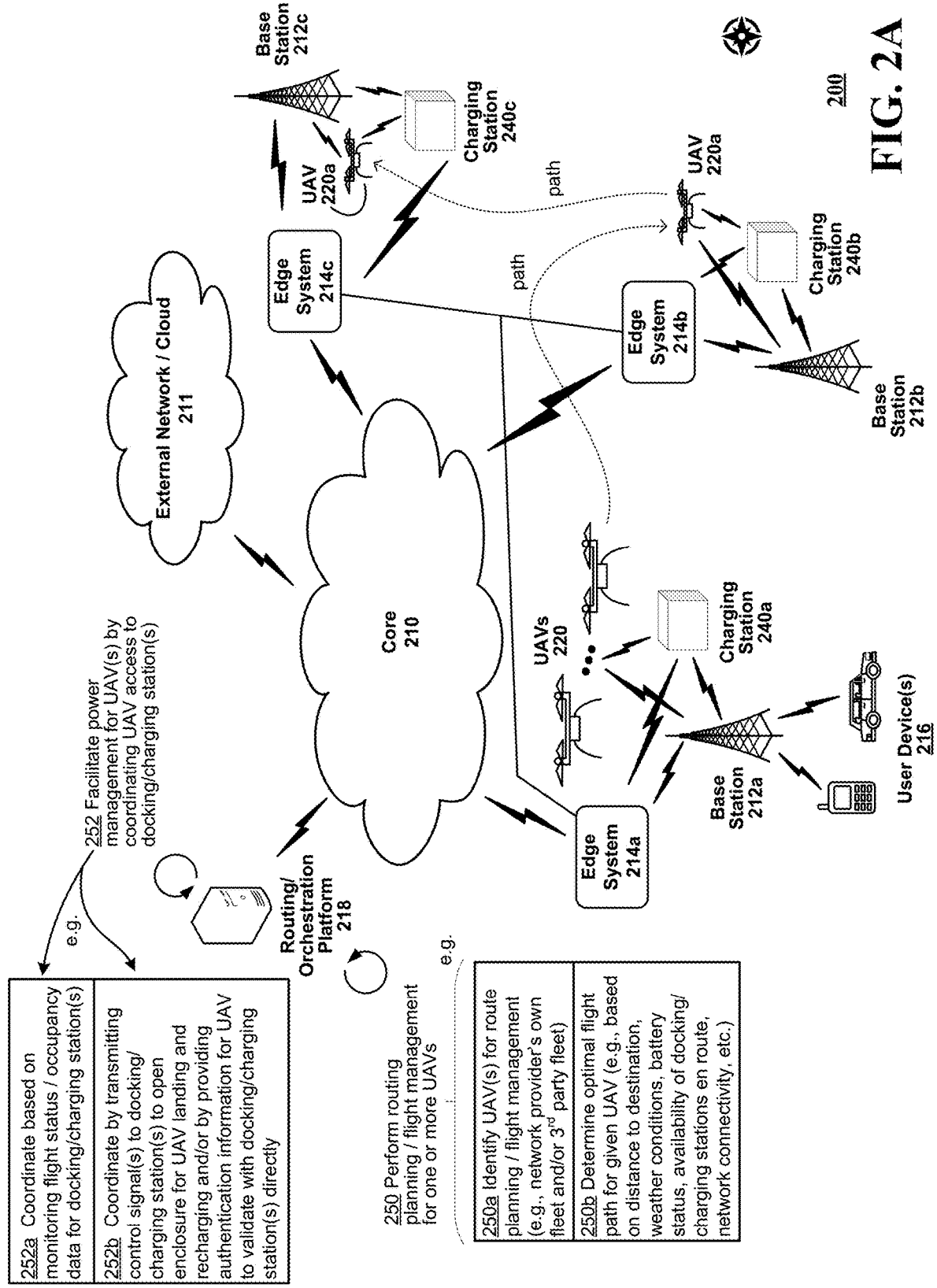
FIG. 2A is a block diagram illustrating an example, non-limiting embodiment of a system functioning within, or operatively overlaid upon, the communications network of FIG. 1 in accordance with various aspects described herein.

FIG. 2A is a block diagram illustrating an example, non-limiting embodiment of a system 200 configured to function in, or in conjunction with, various communication systems and networks, including, for example, the communications system 100 of FIG. 1, in accordance with various aspects described herein.

As shown in FIG. 2A, the system 200 may include one or more network nodes or access points—e.g., base stations 212a, 212b, 212c, or the like—that each provides a radio access technology capable of facilitating communications between a core network 210 and user devices 216 and/or UAVs 220. The core network 210 may be communicatively coupled to an external network/cloud 211 (e.g., an Internet). The user devices 216 can each include one or more data terminals, one or more mobile devices, one or more vehicles, one or more display devices, or one or more other client devices. A UAV 220 may include any personal or commercial aerial vehicle or device equipped with one or more types of devices or components for performing various actions. For example, a UAV 220 may include one or more radio equipment configured to function as a cellular relay, one or more sensors (e.g., image sensor(s), infrared sensor(s), near infrared camera(s), radar system(s), light detection and ranging (LIDAR) system(s), biological sensor(s), temperature sensor(s), chemical sensor(s), humidity sensor(s), and/or the like) for capturing information/data in an environment of the UAV 220, one or more mechanical limbs for physically manipulating external objects, and/or the like.

As depicted, the system 200 may include a routing/orchestration platform 218 that is configured to perform route planning, flight management, and/or power management for one or more fleets of UAVs. The system 200 may also include any number of edge systems/devices associated with base stations—e.g., an edge system 214a corresponding to the base station 212a, an edge system 214b corresponding to the base station 212b, an edge system 214c corresponding to the base station 212c, and so on. In certain embodiments, an edge system may correspond to, or be associated with, more than one base station. The particular functions performed by the edge systems 214a, 214b, and/or 214c can vary based on various criteria, including requirements of the network. Although not shown, the base stations 212a, 212b, and 212c and corresponding edge systems 214a, 214b, and 214c may be associated with (e.g., respective) cells, such as heterogeneous cells (e.g., that provide access to the system 200 using different types of radio access technologies). In various embodiments, the cells can be terrestrial cells (e.g., one or more macrocells, small cells or microcells, Wi-Fi-based cell(s), or the like) or non-terrestrial cells (e.g., a flying cell, or drone cell, served by UAVs 220 or other UAVs). The system 200 can include various quantities of cells (e.g., primary cells and/or secondary cells), various quantities of base stations in a cell, and/or various types of base stations and/or cells. User devices 216 and/or UAVs 220 can be located within cell coverage areas of the system 200, provided by cells associated with the base stations 212a, 212b, and/or 212c, and may travel amongst various ones of the cells.

In one or more embodiments, one or more of the edge systems 214a, 214b, and 214c may include multi-access edge computing (MEC) network(s) and compute device(s), which may be useful in reducing (e.g., minimizing) delays associated with provisioning of data or services to one or more (requesting) devices located proximate to (e.g., within a threshold distance from) the corresponding base station. In various embodiments, one or more of the edge systems 214a, 214b, and 214c may include a MEC Hub device and compute device(s) communicatively coupled to the MEC Hub device that function as controller(s) in respective heterogeneous cells. In certain embodiments, one or more of the MEC Hub device and/or the compute devices can additionally, or alternatively, function as a controller for non-terrestrial cells. In some embodiments, a MEC Hub device and compute devices can be communicatively coupled to one another via an interface, such as a wired and/or a wireless interface (e.g., fiber cable(s), hybrid fiber-coaxial (HFC) cable(s), or the like). In some embodiments, a MEC Hub device can function as a centralized MEC node for the various cells. For example, in a network disaster recovery situation, the MEC Hub device can function as a master MEC in the multiple-cell infrastructure and coordinate operations of the compute devices.

In various embodiments, one or more (e.g., each) of the edge systems 214a, 214b, and 214c (e.g., a MEC Hub device and/or compute devices) can store data relating to user devices 216 and/or UAVs 220 in a data structure (e.g., a database, an array, a linked list, a table, a tree, and/or the like). In one or more embodiments, the edge systems 214a, 214b, and 214c (e.g., each of the edge systems 214a, 214b, and 214c) can receive the data from an associated base station (e.g., one or more of the base stations 212a, 212b, and 212c) and/or from one or more of the other compute devices (e.g., via the abovementioned interface). The data relating to a user device 216 (and/or a UAV 220) can include, for example, information regarding an identity of the user device/UAV, a current location of the user device/UAV, current signal strength(s) of nearby access points as measured by the user device/UAV, a direction of movement of the user device/UAV, a speed of travel of the user device/UAV, physical layer properties of the user device/UAV, signal round trip times (RTT), etc. In various embodiments, for example, a MEC Hub device and/or compute devices can dynamically update entries in the data structure in real-time, or near real-time, as updated data relating to a user device/UAV is received.

In various embodiments, one or more (e.g., each) of the edge systems 214a, 214b, and 214c (e.g., a MEC Hub device and/or compute devices) can manage an inventory of associated base stations, such as base stations 212a, 212b, and 212c, and can store data relating to such base stations in a data structure (e.g., a database, an array, a linked list, a table, a tree, and/or the like). The data relating to a base station can include, for example, information regarding an identity of the base station (e.g., a physical cell identifier (PCI) or the like), a location of the base station, actual or estimated available bandwidth of the base station, throughput of the base station, etc. In various embodiments, for example, a MEC Hub device and/or compute devices can dynamically update entries in the data structure in real-time, or near real-time, as updated data relating to the associated base station is received.

In exemplary embodiments, the system 200 may include a network of docking/charging stations. For example, as shown in FIG. 2A, the system 200 may include docking/charging stations 240a, 240b, and 240c. It is to be appreciated and understood that the system 200 may include any number of docking/charging stations, such as more or fewer than those shown in FIG. 2A. In exemplary embodiments, the docking/charging stations 240a, 240b, and 240c may be distributed, or located, throughout a geographic footprint associated with a network provider. In various embodiments, one or more of the docking/charging stations 240a, 240b, and 240c may be disposed at or proximate to (e.g., within a threshold distance from) components or systems of the network provider, such as base stations 212a, 212b, 212c and/or edge systems 214a, 214b, 214c located throughout geographic region(s). In one or more embodiments, the docking/charging stations 240a, 240b, and 240c (e.g., each of the docking/charging stations 240a, 240b, and 240c) may be located on a cell tower (e.g., a tower top) of a respective base station. For example, the docking/charging station 240a may be located on a cell tower of the base station 212a, the docking/charging station 240b may be located on a cell tower of the base station 212b, and the docking/charging station 240c may be located on a cell tower of the base station 212c. In various embodiments, a docking/charging station may be located away from antennas at a tower top (e.g., by a predetermined distance) so as to avoid negatively impacting operations of the antennas. In certain embodiments, a docking/charging station may be communicatively coupled to a base station and/or an edge system for network connectivity. For example, as shown in FIG. 2A, the docking/charging station 240a may be communicatively coupled to the base station 212a and/or the edge system 214a, the docking/charging station 240b may be communicatively coupled to the base station 212b and/or the edge system 214b, and/or the docking/charging station 240c may be communicatively coupled to the base station 212c and/or the edge system 214c.

As shown by reference number 250, the routing/orchestration platform 218 may perform routing planning/flight management for one or more UAVs. For example, in some embodiments, and as shown by reference number 250a, the routing/orchestration platform 218 may identify UAV(s) 220 for route planning and/or flight management. As shown by reference number 250b, the routing/orchestration platform 218 may determine an optimal flight path for the identified UAV (e.g., each of multiple UAVs being planned for or managed). In various embodiments, the routing/orchestration platform 218 may provide route planning/flight management for the network operator's own fleet of UAVs (e.g., whether for the network operator's own purposes or on behalf of one or more third parties). In certain embodiments, the routing/orchestration platform 218 may additionally, or alternatively, provide route planning/flight management for UAVs owned/operated by one or more third parties (e.g., as described in more detail below). In various embodiments, the routing/orchestration platform 218 may determine an optimal flight path for an identified UAV based on a determined distance from a starting location to a destination location for the UAV, weather conditions in geographic region(s) between the starting and destination locations, a model of the UAV, a type of the UAV, a manufacturer of the UAV, a capability of the UAV, a battery type or battery status for the UAV, availability of docking/charging stations between the starting and destination locations, distances between docking/charging stations, UAV connectivity to the network, and/or the like. For instance, in some embodiments, the routing/orchestration platform 218 may determine a flight path in which there is sufficient network coverage for a UAV (e.g., network signal strength(s) greater than a threshold level or the like). This can be important in cases where mid-flight monitoring of the UAV is desired or where mid-flight intervention by a human operator is desired (despite UAV operations being autonomous). In some instances, such as in an emergency situation, a disaster scenario, or the like, network coverage may be affected without notice. In certain embodiments, therefore, the routing/orchestration platform 218 may be configured to (e.g., periodically or based upon one or more conditions being satisfied) poll various portions of the overall network (e.g., edge systems 214a, 214b, and/or 214c and/or base stations 212a, 212b, and/or 212c) to determine coverage availability, and utilize results of the polling to determine a flight path for a UAV.

In various embodiments, in a case where the routing/orchestration platform 218 determines/predicts that a UAV may not reach a destination location unless the UAV is recharged in route, the routing/orchestration platform 218 may determine a flight path in which the UAV recharges at one or more docking/charging stations along the way. In one or more embodiments, in a case where the routing/orchestration platform 218 determines that a UAV may reach a destination location without needing to recharge en route, the routing/orchestration platform 218 may simply determine a flight path without identifying docking/charging station(s) for the UAV.

In exemplary embodiments, aspects of the routing/orchestration platform 218 may be API-driven. In one or more embodiments, the API may enable external input of data/control commands associated with UAV route planning, flight management, and/or power management. The routing/orchestration platform 218 may, therefore, be configured to enable the network provider to not only operate its own fleet of UAVs, but to facilitate external use of the system by third-party fleet(s) (e.g., via server services or the like). A third-party entity (e.g., vendor or customer) may, for example, through advanced registration/reservation with the network provider, leverage (e.g., via a third-party UAV management system and the external network/cloud 211) the routing/orchestration platform 218's route planning and flight management functionalities as well as overall power management functionalities, including by submitting requests for, and utilizing, the various docking/charging stations 240a, 240b, and/or 240c for UAV recharging purposes.

As shown by reference number 252, the routing/orchestration platform 218 may facilitate power management for UAVs by coordinating UAV access to docking/charging station(s). For example, in some embodiments, and as shown by reference number 252a, the routing/orchestration platform 218 may coordinate the access based on monitoring a flight status of UAV(s) and/or occupancy data for docking/charging station(s). As another example, in some embodiments, and as shown by reference number 252b, the routing/orchestration platform 218 may additionally, or alternatively, coordinate the access by transmitting control signal(s) to docking/charging station(s) to open for UAV landing and recharging and/or by providing authentication information for the UAV to validate with docking/charging station(s) directly.

In certain embodiments, the routing/orchestration platform 218 may be accessible via the API for (e.g., software-based) control of the opening and closing of enclosures of the docking/charging stations 240a, 240b, and/or 240c for landing/launching of UAVs 220. In some embodiments, the routing/orchestration platform 218 may be configured to orchestrate, for a given UAV, knowledge of a type of the UAV, capabilities of the UAV, locations and occupancy statuses of docking/charging stations 240a, 240b, and/or 240c that are accessible to the UAV, and/or the like, utilize this information to process third-party requests for use of the docking/charging stations 240a, 240b, and/or 240c, provide location information (e.g., GPS coordinates) of available ones of the docking/charging stations 240a, 240b, and/or 240c, provide access information on how to communicate with the docking/charging stations 240a, 240b, and/or 240c, and/or facilitate physical access to (e.g., opening/closing of) the docking/charging stations 240a, 240b, and/or 240c. For instance, in certain embodiments, a docking/charging station may include a communication and control system with which a UAV 220 may communicate via a wireless communication protocol. In these embodiments, a (e.g., third-party) UAV 220 may, using the abovementioned access information, communicate with the docking/charging station to authenticate the UAV 220 and control opening of the docking/charging station for landing and recharging. In alternate embodiments, the routing/orchestration platform 218 may, based upon monitoring the location of a UAV 220, control opening of a target docking/charging station when the UAV 220 is proximate to (e.g., within a threshold distance from) the target docking/charging station. In some embodiments, the routing/orchestration platform 218 and/or the docking/charging station may receive, from the UAV 220, an API request that includes the abovementioned access information and/or network data, such as unique radio equipment identifier(s) (e.g., an identifier associated with a base station receiving the API request/radio signal), data regarding signal measurements, and/or the like, and may process the API request based on the access information and/or the network data to determine whether to grant the UAV 220 access to the docking/charging station. In this way, if the docking/charging station 240a, for example, is initially arranged to accommodate the UAV 220, and the UAV 220 provides an API request that includes, for example, GPS coordinates near or associated with (e.g., within a threshold distance to) base station 212a, but the radio signal for the API request is instead received at base station 212c, then the routing/orchestration platform 218 and/or the docking/charging station 240a may deny the API request or may perform additional approval processing (e.g., by facilitating arrangement of docking/charging station 240c to accommodate the UAV 220).

In some embodiments, a UAV 220 may be assigned to a docking/charging station—e.g., docking/charging station 240a, 240b, or 240c—as its "home" location. For instance, where the docking/charging stations 240a, 240b, and/or 240c are mounted on cell towers, the docking/charging station(s) may function as a "drone airport," and the UAVs may be accessible as "tower-mounted" equipment of the network operator. In a case where regularly scheduled servicing, or emergency repair, of a UAV 220 is needed, the routing/orchestration platform 218 may cause the UAV 220 to be automatically dispatched—e.g., in accordance with a flight schedule—to an appropriate service center for maintenance/repair. Where the routing/orchestration platform 218 determines that a distance between the home location and the service center is great enough to necessitate one or more stops of the UAV 220 for recharging (e.g., based on known battery capacity of the UAV 220 and power draw needed to traverse the distance), the routing/orchestration platform 218 may coordinate access/use of one or more docking/charging stations—e.g., docking/charging station 240a, 240b, and/or 240c—such that the UAV 220 may recharge en route to the service center.

In certain embodiments, the routing/orchestration platform 218 may be configured to control occupancy of a docking/charging station by coordinating a first UAV 220, which may, for example, be assigned to the docking/charging station as the UAV's home location, to vacate, or temporarily dispatch, the docking/charging station in order to allow a second, "guest" or "visiting" UAV 220 to dock to, charge at, and depart from the docking/charging station prior to the first UAV 220 returning to its home location. In various embodiments, the routing/orchestration platform 218 may identify one or more other docking/charging stations to which the first UAV 220 may be "rehomed." Having standardized docking/charging stations—e.g., with standardized self-charging ports—thus enables efficient interchangeable use of the docking/charging stations by UAVs of various types and capabilities.

In one or more embodiments, one or more (e.g., each) of the docking/charging stations 240a, 240b, and 240c may be configured, or standardized, for docking and/or charging of a variety of types of UAVs 220 produced by various manufacturers. For example, one or more (e.g., each) of the docking/charging stations 240a, 240b, and 240c may be designed in accordance with a multi-vendor standard that allows UAVs 220 of a variety of shapes, sizes, and/or capabilities to autonomously land in or on the docking/charging station and couple or connect to a power source in order to recharge, with minimal to no human assistance.

A docking/charging station can be configured in any shape or combination of shapes with any suitable dimensions. In various embodiments, the shape and/or dimensions of one or more (e.g., each) of the docking/charging stations 240a, 240b, and 240c may be selected to accommodate docking/charging of one or more UAVs 220. For example, a docking/charging station can be configured to accommodate docking/charging of only a single UAV 220 or of multiple UAVs 220, such as two UAVs 220, three UAVs 220, ten UAVs 220, and so on.

Figure 2B:
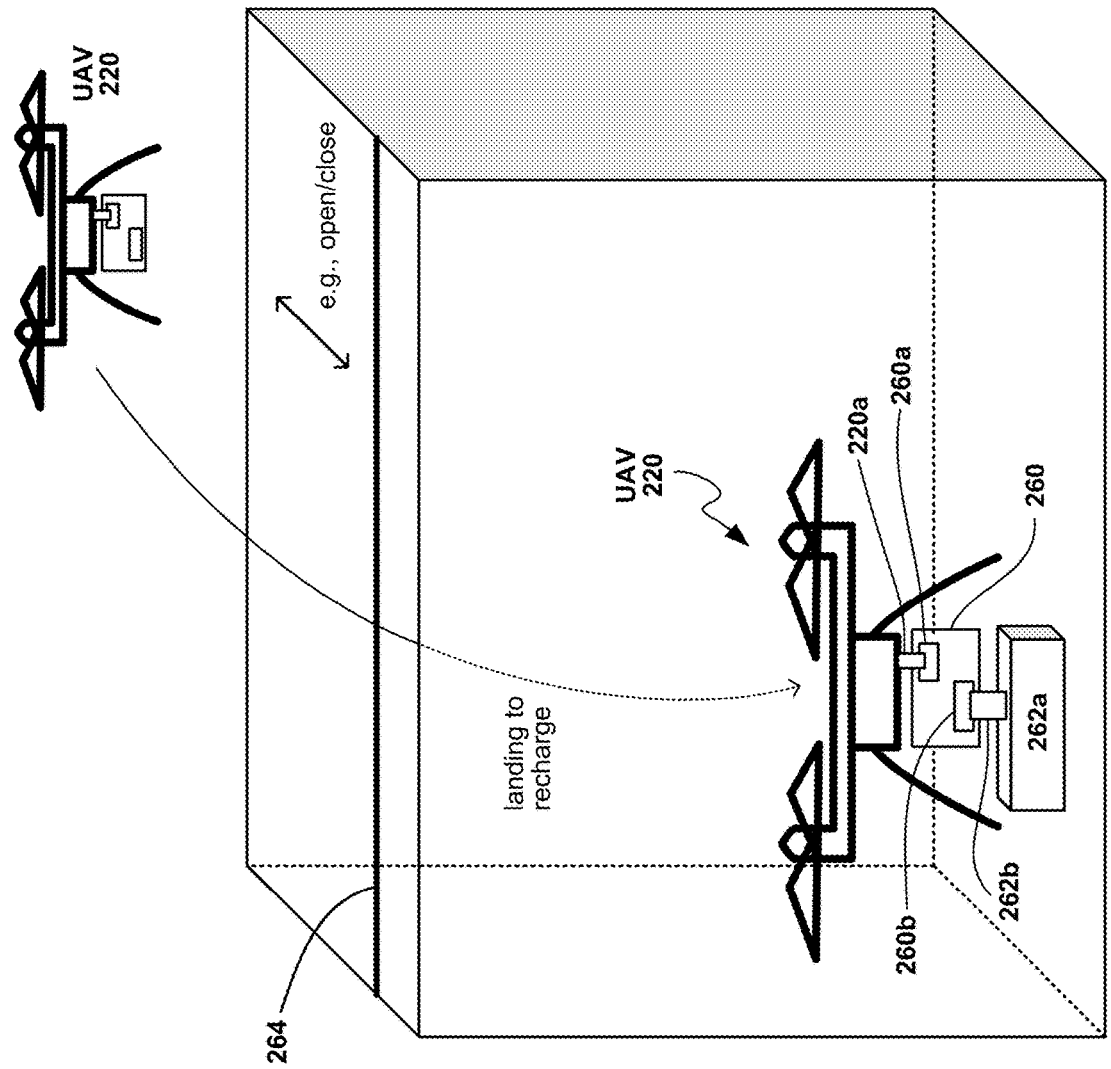
FIG. 2B depicts an illustrative embodiment of a UAV docking/charging station of the system of FIG. 2A in accordance with various aspects described herein.

In exemplary embodiments, and as shown in FIG. 2B, a standardized (e.g., add-on) power adapter device 260 may be provided to interface a UAV 220 and a power source 262a of one or more (e.g., each) of the docking/charging stations 240a, 240b, and 240c. As shown in FIG. 2B, for example, the standardized power adapter device 260 may include a first electrical connector 260a configured to interface with a complementary electrical connector 220a of a UAV 220, and may be detachably coupled or mounted to the UAV 220. The power adapter device 260 may also include a second electrical connector 260b configured to interface with a complementary electrical connector 262b of a docking/charging station 240a, 240b, or 240c. In certain embodiments, the second electrical connector 260b and the complementary electrical connector 262b may be configured to magnetically attract, or couple to, one another, which can facilitate positioning/alignment of the UAV 220 during landing in or on the docking/charging station 240a, 240b, or 240c. With a standardized UAV self-charging port (e.g., offering "zero-touch" connectivity), therefore, UAVs 220 provided by different vendors may utilize the same docking/charging station interchangeably.

In various embodiments, and as further shown in FIG. 2B, one or more (e.g., each) of the docking/charging stations 240a, 240b, and 240c may be designed to include a weatherproof enclosure (which can, e.g., protect the docking/charging station and/or UAVs while idle or charging therein from rain, snow, dust, or other external debris). As depicted, the enclosure may include a remotely operable ingress/egress mechanism 264—e.g., cover/lid, door, gate, or the like—that can be controlled to permit a UAV 220 to enter the enclosure for stationing/recharging and to exit the enclosure, with minimal to no human interaction. In certain embodiments, a docking/charging station may be secured to a mounting structure with one or more locks or the like and/or may be positioned in a gated or fenced area to prevent theft or other undesired tampering of the stations and/or UAVs 220. It is to be appreciated and understood that the ingress/egress mechanism 264 may be controllable via one or more motors or the like, and may be configured to operate in any suitable manner—e.g., slidably open/close or rotatably open/close.

Providing an infrastructure of UAV docking/charging stations and a centralized (e.g., API-driven) system for coordinating routing and overall management of networked UAVs enables autonomous UAV operations and services, including automated UAV health/power monitoring and dispatching of UAVs for maintenance/repair, with minimal to no human intervention. UAVs can be more easily, and less expensively, deployed for a variety of operations or missions, including, for example, automated (e.g., video-based) inspections of network equipment (e.g., cell towers, wired assets, and/or the like), automated "fly testing" of a cellular network (e.g., as an alternative to "drive testing"), automated monitoring of a broad range of wireless (e.g., 4G/5G) frequencies for strength and/or interference, automated visualization of cell boundaries, cell overlap, and/or interference from physical obstructions, and/or the like.

In exemplary embodiments, the routing/orchestration platform 218 of FIG. 2A may include billing functions configured to charge for third-party use of the docking/charging station(s) 240a, 240b, and/or 240c and/or functionalities of the routing/orchestration platform 218. In various embodiments, for example, the routing/orchestration platform 218 may bill a third party based on each use of a docking/charging station, based on a duration of each use of a docking/charging station, based on a quantity of the third party's UAVs in operation and in need of recharging, based on a preset number of uses of one or more docking/charging stations (e.g., as part of a recharging package or plan), and/or the like.

In some embodiments, the routing/orchestration platform 218 may be configured to receive, via the API, a request from a third-party UAV management system for information (e.g., GPS coordinates, etc.) on available docking/charging stations in a geographic area in which the third party's UAVs may be operating, and respond with such information along with a price for use of the docking/charging station(s). Where the third party chooses to accept this offer, the routing/orchestration platform 218 may facilitate dispatching of UAV(s) homed to the docking/charging station(s) to make room for the third party's UAV(s) (as needed) and/or enable the docking/charging station(s) to open and receive the third party's UAV(s) for recharging.

Facilitating fully autonomous (e.g., out-of-sight) UAV operations, as described herein, allows for rapid responses in disaster situations, as UAVs 220 may be automatically dispatched from undamaged or unaffected docking/charging stations proximate to (e.g., around a perimeter of) a disaster area to conduct advanced reconnaissance/surveillance and data gathering—e.g., immediately after a disastrous event has occurred or is over. Where the disaster involves a storm, such as a hurricane, for example, UAV-based reconnaissance/surveillance can enable early assessment of damage to towers/lines by flood/winds even before roads have been cleared. Cooperation with utility companies after a storm/flooding can also be facilitated, as UAV(s) can be dispatched to obtain video feed(s) of downed power lines or the like, which can enable a power company, for example, to obtain earlier assessments of damages. In various embodiments, the routing/orchestration platform 218 may identify docking/charging station(s) 240a, 240b, and/or 240c that are still functional, selectively communicate with affected edge systems 214a, 214b, and/or 214c for load distribution or redistribution, and/or the like, which can facilitate data transfer to edge systems located in other unaffected (or less-affected) areas and/or re-routing of UAVs to functional docking/charging station(s) such that data is preserved and/or an optimal number of UAVs remains in operation to assist in disaster recovery efforts.

In exemplary embodiments, a system—e.g., the system 200—may be configured with an autonomous edge cloud system that is capable of facilitating data storage, transfer, and/or synchronization (e.g., as a universal service broker), which can ensure data integrity in disaster scenarios or the like. For instance, in various embodiments, the edge systems 214a, 214b, and 214c of the system 200 of FIG. 2A may form (e.g., a portion of) an autonomous edge cloud system, where data may be stored locally at individual edge systems, but may be fully or partially transferrable or movable to one or more other edge systems—e.g., differences between data sets, and thus condensed data packages, may be transferrable or movable amongst the edge systems. In one or more embodiments, the autonomous edge cloud system may initiate data transfer, or synchronization, between select edge systems based on determining that data at an edge system (e.g., a MEC network/Hub device, compute device(s), or the like) is at risk of being lost or corrupted or is likely to be compromised (e.g., in a cyber-attack). In various embodiments, the autonomous edge cloud system may obtain data from one or more local sensors (e.g., temperature sensors, humidity sensors, pressure sensors, image sensors, audio sensors, or other types of sensors) and/or employ one or more detection algorithms to determine/predict whether data at an edge system (e.g., a MEC network/Hub device, compute device(s)) is at risk or likely to be compromised. For example, the autonomous edge cloud system may determine/predict that data at an edge system is at risk or likely to be compromised, and may automatically generate a threat assessment value or the like, based on reported or sensor-detected weather data in a geographic region associated with a certain edge system exceeding threshold(s), based on reported or sensor-detected weather data in another geographic region associated with another edge system not exceeding such threshold(s), based on receiving certain local alerts, based on receiving government announcements and/or announcements from other sources (e.g., a weather service or the like), based on receiving a user command, and/or the like. In this way, the autonomous edge cloud system may identify or provide collection point(s) for real-time (or near real-time) data transfer/processing as needed.

In exemplary embodiments, the autonomous edge cloud system may (e.g., using one or more algorithms and/or network APIs) be capable of identifying one or more candidate/target edge systems to transfer or sync data to. The autonomous edge cloud system may, for example, perform this check periodically or based on determining/predicting that data at an edge system (e.g., a MEC network/Hub device, compute device(s), or the like) is at risk or likely to be compromised. In certain embodiments, the autonomous edge cloud system may perform dynamic self-discovery, or self-analysis, of edge systems to ascertain their operational statuses. In various embodiments, the autonomous edge cloud system may, for a given edge system whose data is determined/predicted to be at risk or as being likely to be compromised, perform "health checks" or the like of one or more other edge systems (e.g., that are in closest proximity to the affected edge system, that have lowest latency values relative to the affected edge system, that are accessible via a fewest number of hops, and/or the like) to ascertain their operational statuses, and utilize results of the health checks to identify candidate/target edge systems. In some embodiments, the autonomous edge cloud system may obtain or access a table of resources that includes data regarding some or all edge system resources operating in various geographic regions, and utilize this table to identify candidate/target edge systems. In a case where the autonomous edge cloud system identifies a candidate/target edge system, and determines that certain data to be transferred thereto requires certain resources (e.g., execution of a specific edge-based application), the autonomous edge cloud system may instruct, or otherwise cause, the candidate/target edge system to initialize (or "spin up") the appropriate workload/software resources. In the context of disaster recovery, therefore, the autonomous edge cloud system can proactively identify a (e.g., relatively) safer location/system (e.g., "bunker" centralized data center) to store threatened data—even if temporarily—and transfer/sync that threatened data thereto.

In exemplary embodiments, in a case where the autonomous edge cloud system determines/predicts that data at an edge system (e.g., a MEC network/Hub device, compute device(s), or the like) is at risk or likely to be compromised, the autonomous edge cloud system may (e.g., using one or more algorithms) identify the data or sets of data that ought to be transferred or synchronized to one or more other edge systems. In various embodiments, the autonomous edge cloud system may rank data sets based on various factors, such as by data type (e.g., where data relating to the operation of autonomous vehicles or other safety-critical systems may be associated with a higher priority than other types of data), recency of the data sets (e.g., where newer data may be associated with a higher priority than older data, or vice versa), subscription plans associated with the data sets (e.g., where a data set associated with a subscriber whose subscription plan is of a higher tier may be associated with a higher priority than a data set associated with a subscriber whose subscription plan is of a lower tier, or vice versa), and/or the like.

In various embodiments, the autonomous edge cloud system may be implemented independently of implementations of the routing/orchestration platform 218 and the docking/charging stations 240a, 240b, and 240c. In certain embodiments, the autonomous edge cloud system may be implemented in addition to the routing/orchestration platform 218 and the docking/charging stations 240a, 240b, and 240c. In one or more embodiments, the autonomous edge cloud system may be configured to leverage UAV(s) 220 as data transport vehicles. For instance, where the autonomous edge cloud system determines/predicts that data at an edge system (e.g., a MEC network/Hub device, compute device (s), or the like) is at risk or likely to be compromised, the autonomous edge cloud system may identify one or more UAV(s) 220 (e.g., nearest to the edge system), cause the data to be transferred or copied onto a storage device on the identified UAV(s) 220, cause the identified UAV(s) 220 to move toward candidate/target edge system(s), and cause the copied data to be transferred or copied over to the candidate/target edge system(s) (e.g., when the UAV(s) 220 are within a threshold distance from the candidate/target edge system (s) and/or when signal strength(s) between the UAV(s) and the candidate/target edge system(s) satisfy threshold(s)). In certain embodiments, in a case where a data storage system of a given UAV 220 stores (e.g., only stores) data in particular format(s), the autonomous edge cloud system may facilitate conversion of the at-risk data into the particular format(s) prior to causing such data to be transferred to the UAV 220. In various embodiments, for data that is determined to be sensitive/at-risk, the autonomous edge cloud system may, depending on the sensitivity of the data (e.g., as identified by appropriate associated metadata, overall mission categorization, and/or the like) completely and securely erase the data from an edge system—e.g., after such data is copied/transferred to another edge system, to a UAV 220, etc. as described herein. This can, for example, avoid unauthorized disclosure of such data (which may include critical military, corporate information, etc.), which can otherwise be worse than the loss of the data itself.

In various embodiments, some or all of the functionality (e.g., server service(s)) of the routing/orchestration platform 218 may be implemented in edge computing or compute device(s) (e.g., rather than as a separate, centralized platform in the cloud/core network 210). This can be in addition to, or alternative to, the functionality being implemented in a centralized system. In the case of (e.g., possible) network outage or a disaster situation, for example, there may be insufficient network capacity to communicate data relating to UAV route planning, flight management, and/or power management due to limited network path availability. Tracking UAV movements and positions is crucial in such situations, given that UAVs may be most relied upon during these times. Implementing aspects of the routing/orchestration platform 218 locally—e.g., at individual edge systems 214a, 214b, and/or 214c and facilitated by the autonomous edge cloud system—therefore enables UAV-related processing/operations, such as UAV recharging or dispatching for repairs, maintenance, inspections, and so on, to be maintained. Furthermore, implementing aspects of the routing/orchestration platform 218 locally also enables faster UAV route planning, flight management, and/or power management processing. For instance, this can enable more precise control (e.g., micro-control) of UAV movements, which can be important in certain operations, such as those that involve UAV-based video capture/analysis of equipment, where wind conditions can cause a UAV to move about undesirably and precise feedback-based control of the UAV via a centralized cloud may be difficult due to higher network latencies.

Thus, the autonomous edge cloud system provides a centralized, but relatively local, edge compute environment/orchestration service (e.g., a mesh network/mesh instantiation of computing at edge(s) of the network) that can maintain network/data integrity, thereby ensuring network reliability and/or optimization. In cases where the routing/orchestration platform 218 and implementations of docking/charging stations are employed or involved, the autonomous edge cloud system can additionally, or alternatively, orchestrate data collection from UAVs. For instance, where a UAV is collecting data and storing the collected data to a particular edge system, the autonomous edge cloud system can identify possible loss of that collected data (e.g., based on the above-described condition(s), such as inclement weather, etc., being satisfied), and conduct inter-edge system copying or transferring of the collected data as a proactive/preventive measure. Here, the autonomous edge cloud system may, therefore, be capable of not only orchestrating UAV route planning, flight management, and/or power management, but also effecting synchronization of data associated with UAV operations.

In one or more embodiments, the autonomous edge cloud system may be configured to perform dynamic re-routing of network connectivity. In certain embodiments, for example, where edge systems 214*a*, 214*b*, and 214*c* are implemented as MEC network/Hub device(s) and compute device(s), the autonomous edge cloud system may (e.g., based upon identifying network servicing, such as a fiber cut or the like) facilitate re-routing of network connectivity from one or more MEC network/Hub devices and compute devices to the core network 210, where an alternate traffic path to the core network 210 may be identified and used, thereby assuring service continuity.

In various embodiments, the system 200 may facilitate locating of services on the network. In one or more embodiments, the system 200 may expose network data to service application developers to enable the developers to architect decision-making processes. In certain embodiments, the system 200 may include one or more AI algorithms that interface with service applications, obtain/analyze data or requests, and respond with information/recommendations, and/or the like to facilitate various use cases. As an example, in the context of (e.g., autonomous) vehicles, the system 200 may support acquiring of updates for vehicle navigation purposes, determining of optimal paths for a vehicle to obtain maintenance at a service area (e.g., at a dealership, etc.), and so on. In some embodiments, the system 200 may operate in accordance with user opt-in/permissions, privacy/location sharing settings, and/or the like.

It is to be understood and appreciated that the quantity and arrangement of platforms, systems, networks, clouds, UAVs, base stations, docking/charging stations, devices, connectors, and adapters shown in FIGS. 2A and/or 2B are provided as an example. In practice, there may be additional platforms, systems, networks, clouds, UAVs, base stations, docking/charging stations, devices, connectors, and/or adapters, different platforms, systems, networks, clouds, UAVs, base stations, docking/charging stations, devices, connectors, and/or adapters, or differently arranged platforms, systems, networks, clouds, UAVs, base stations, docking/charging stations, devices, connectors, and/or adapters than those shown in FIGS. 2A and/or 2B. For example, the system 200 can include more or fewer platforms, systems, networks, clouds, UAVs, base stations, docking/charging stations, devices, connectors, and/or adapters, etc. In practice, therefore, there can be hundreds, thousands, millions, billions, etc. of such platforms, systems, networks, clouds, UAVs, base stations, docking/charging stations, devices, connectors, and/or adapters. In this way, example system 200 can coordinate, or operate in conjunction with, a set of platforms, systems, networks, clouds, UAVs, base stations, docking/charging stations, devices, connectors, and/or adapters and/or operate on data sets that cannot be managed manually or objectively by a human actor. Furthermore, two or more platforms, systems, networks, clouds, UAVs, base stations, docking/charging stations, devices, connectors, or adapters shown in FIGS. 2A and/or 2B may be implemented within a single platform, system, network, cloud, UAV, base station, docking/charging station, device, connector, or adapter, or a single platform, system, network, cloud, UAV, base station, docking/charging station, device, connector, or adapter shown in FIGS. 2A and/or 2B may be implemented as multiple platforms, systems, networks, clouds, UAVs, base stations, docking/charging stations, devices, connectors, or adapters. Additionally, or alternatively, a set of platforms, systems, networks, clouds, UAVs, base stations, docking/charging stations, devices, connectors, or adapters of the system 200 may perform one or more functions described as being performed by another set of platforms, systems, networks, clouds, UAVs, base stations, docking/charging stations, devices, connectors, or adapters of the system 200.

Figure 2C:
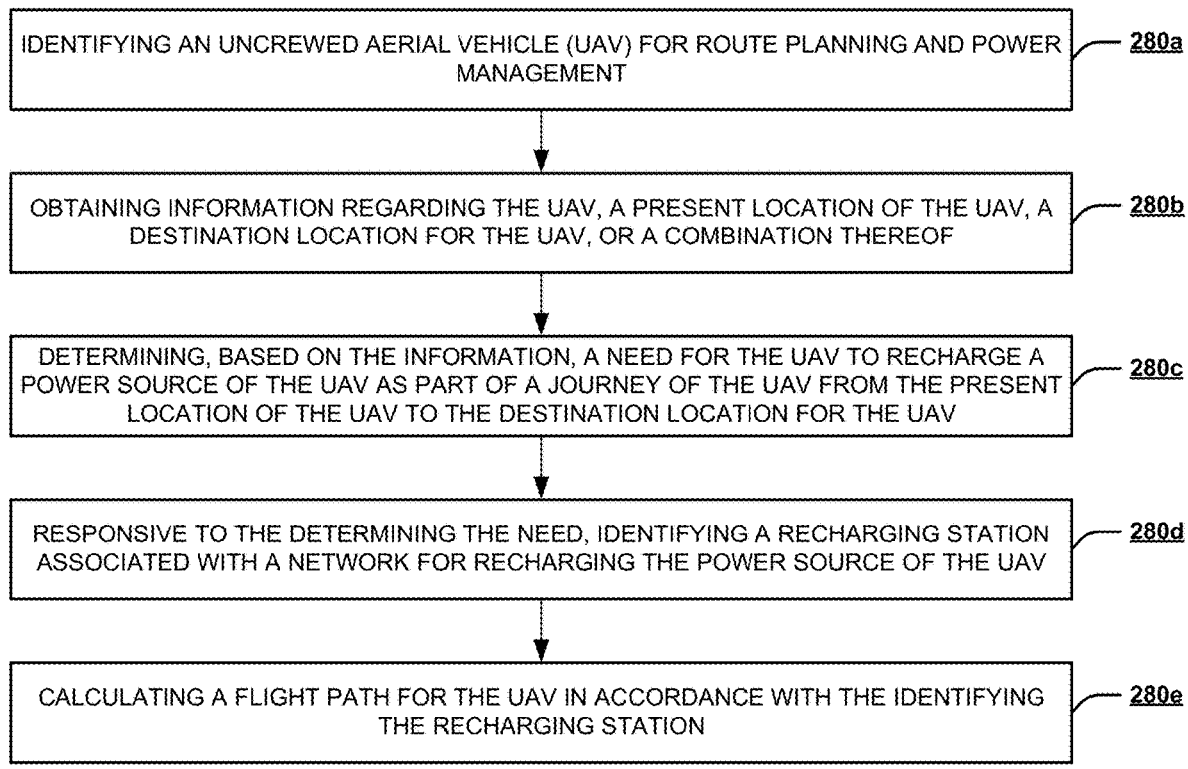
FIG. 2C depicts an illustrative embodiment of a method in accordance with various aspects described herein.

FIG. 2C depicts an illustrative embodiment of a method 280 in accordance with various aspects described herein. In some embodiments, one or more process blocks of FIG. 2C can be performed by a routing/orchestration platform, such as the routing/orchestration platform 218. In some embodiments, one or more process blocks of FIG. 2C may be performed by another device or a group of devices separate from or including the routing/orchestration platform 218, such as edge system 214*a*, 214*b*, and/or 214*c*, base station 212*a*, 212*b*, and/or 212*c*, docking/charging station 240*a*, 240*b*, and/or 240*c*, core network 210, external network/cloud 211, UAV(s) 220, or user device(s) 216. In certain embodiments, a device may comprise a processing system of a network including a processor, and a memory that stores executable instructions that, when executed by the processing system, facilitate performance of operations, where the method 280 may comprise such operations.

At 280*a*, the method can include identifying an uncrewed aerial vehicle (UAV) for route planning and power management. For example, the routing/orchestration platform 218 can identify an uncrewed aerial vehicle (UAV) for route planning and power management in a manner similar to that described above with respect to the system 200 of FIG. 2A.

At 280*b*, the method can include obtaining information regarding the UAV, a present location of the UAV, a destination location for the UAV, or a combination thereof. For example, the routing/orchestration platform 218 can obtain information regarding the UAV, a present location of the UAV, a destination location for the UAV, or a combination thereof in a manner similar to that described above with respect to the system 200 of FIG. 2A.

At 280*c*, the method can include determining, based on the information, a need for the UAV to recharge a power source of the UAV as part of a journey of the UAV from the present location of the UAV to the destination location for the UAV. For example, the routing/orchestration platform 218 can determine, based on the information, a need for the UAV to recharge a power source of the UAV as part of a journey of the UAV from the present location of the UAV to the destination location for the UAV in a manner similar to that described above with respect to the system 200 of FIG. 2A.

At 280*d*, the method can include, responsive to the determining the need, identifying a recharging station associated with a network for recharging the power source of the UAV. For example, the routing/orchestration platform 218 can, responsive to the determining the need, identify a recharging station associated with a network for recharging the power source of the UAV in a manner similar to that described above with respect to the system 200 of FIG. 2A.

At 280*e*, the method can include calculating a flight path for the UAV in accordance with the identifying the recharging station. For example, the routing/orchestration platform 218 can calculate a flight path for the UAV in accordance with the identifying the recharging station in a manner similar to that described above with respect to the system 200 of FIG. 2A.

In some implementations of these embodiments, the information identifies a distance between the present location of the UAV and the destination location for the UAV, a weather condition in a geographic region between the present location of the UAV and the destination location for the UAV, a model of the UAV, a type of the UAV, a manufacturer of the UAV, a capability of the UAV, a battery status or battery type of the UAV, a remaining distance that the UAV can travel as estimated by the UAV (e.g., based on the UAV's own determined battery status or other onboard-learned information), or a combination thereof.

In some implementations of these embodiments, the UAV is included in a fleet of UAVs associated with an operator of the network.

In some implementations of these embodiments, the UAV is included in a fleet of UAVs associated with a third-party entity.

In some implementations of these embodiments, the processing system comprises an application programming interface (API) for accessing functionalities relating to the route planning and the power management.

In some implementations of these embodiments, the operations further comprise receiving, via the API, a request from a third-party entity for the route planning and the power management, wherein the identifying the UAV is based on the request.

In some implementations of these embodiments, the recharging station comprises an enclosure having a mechanism for revealing an interior portion of the recharging station, wherein the mechanism is controllable over the network via the API.

In some implementations of these embodiments, the recharging station is included in a set of recharging stations associated with the network, wherein each recharging station in the set of recharging stations is configured to accommodate UAVs of different types and different capabilities.

In some implementations of these embodiments, the recharging station is mounted on a cell tower associated with the network.

In some implementations of these embodiments, the recharging station is located within a threshold distance from equipment associated with the network.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2D:
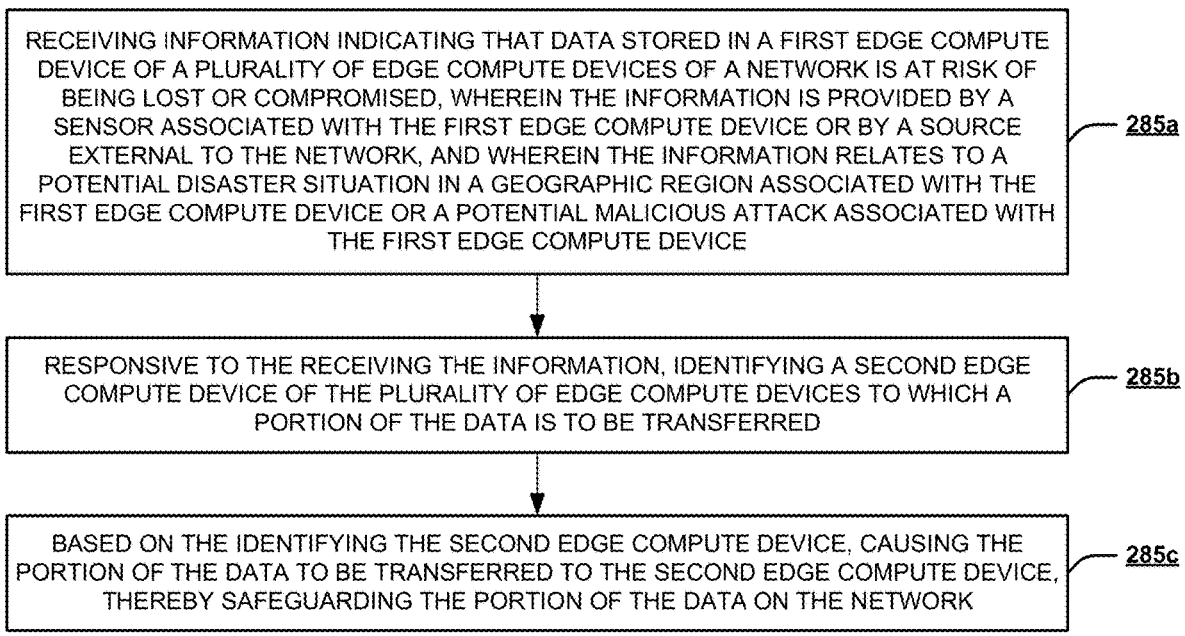
FIG. 2D depicts an illustrative embodiment of a method in accordance with various aspects described herein.

FIG. 2D depicts an illustrative embodiment of a method 285 in accordance with various aspects described herein. In some embodiments, one or more process blocks of FIG. 2D can be performed by an autonomous edge cloud system, such as that described above with respect to FIG. 2A. In some embodiments, one or more process blocks of FIG. 2D may be performed by another device or a group of devices separate from or including the autonomous edge cloud system, such as the routing/orchestration platform 218, edge system 214a, 214b, and/or 214c, base station 212a, 212b, and/or 212c, docking/charging station 240a, 240b, and/or 240c, core network 210, external network/cloud 211, UAV(s) 220, or user device(s) 216. In certain embodiments, a non-transitory machine-readable medium can comprise executable instructions that, when executed by a processing system including a processor and associated with a plurality of edge compute devices of a network, facilitate performance of operations, where the method 285 may comprise such operations.

At 285a, the method can include receiving information indicating that data stored in a first edge compute device of a plurality of edge compute devices of a network is at risk of being lost or compromised, wherein the information is provided by a sensor associated with the first edge compute device or by a source external to the network, and wherein the information relates to a potential disaster situation in a geographic region associated with the first edge compute device or a potential malicious attack associated with the first edge compute device. For example, the autonomous edge cloud system can receive information indicating that data stored in a first edge compute device of a plurality of edge compute devices of a network is at risk of being lost or compromised in a manner similar to that described above with respect to the system 200 of FIG. 2A, where the information is provided by a sensor associated with the first edge compute device or by a source external to the network, and where the information relates to a potential disaster situation in a geographic region associated with the first edge compute device or a potential malicious attack associated with the first edge compute device.

At 285b, the method can include, responsive to the receiving the information, identifying a second edge compute device of the plurality of edge compute devices to which a portion of the data is to be transferred. For example, the autonomous edge cloud system can, responsive to the receiving the information, identify a second edge compute device of the plurality of edge compute devices to which a portion of the data is to be transferred in a manner similar to that described above with respect to the system 200 of FIG. 2A.

At 285c, the method can include, based on the identifying the second edge compute device, causing the portion of the data to be transferred to the second edge compute device, thereby safeguarding the portion of the data on the network. For example, the autonomous edge cloud system can, based on the identifying the second edge compute device, cause the portion of the data to be transferred to the second edge compute device, thereby safeguarding the portion of the data on the network in a manner similar to that described above with respect to the system 200 of FIG. 2A.

In some implementations of these embodiments, prior to the portion of the data being transferred to the second edge compute device, the portion of the data does not exist on the second edge compute device.

In some implementations of these embodiments, the operations further comprise causing network connectivity to be re-routed based on the receiving the information, such that traffic associated with the first edge compute device is directed to an alternate path that does not include the first edge compute device.

In some implementations of these embodiments, the sensor comprises a temperature sensor, a humidity sensor, a pressure sensor, an image sensor, an audio sensor, or a combination thereof, and the source comprises a government entity, a weather service provider, or a combination thereof.

In some implementations of these embodiments, the operations further comprise determining respective priorities for different portions of the data, wherein the portion of the data is associated with a highest priority relative to other portions of the data, and wherein the identifying the second edge compute device is based on a latency relating to the second edge compute device, a proximity of the second edge compute device to the first edge compute device, or a combination thereof.

In some implementations of these embodiments, the causing the portion of the data to be transferred to the second edge compute device comprises causing the portion of the data to be transferred to the second edge compute device via a communication path of the network between the first edge compute device and the second edge compute device, or causing one or more uncrewed aerial vehicles (UAVs) to obtain the portion of the data from the first edge compute device, resulting in a copied portion of the data; travel toward the second edge compute device; and provide the copied portion of the data to the second edge compute device.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2E:
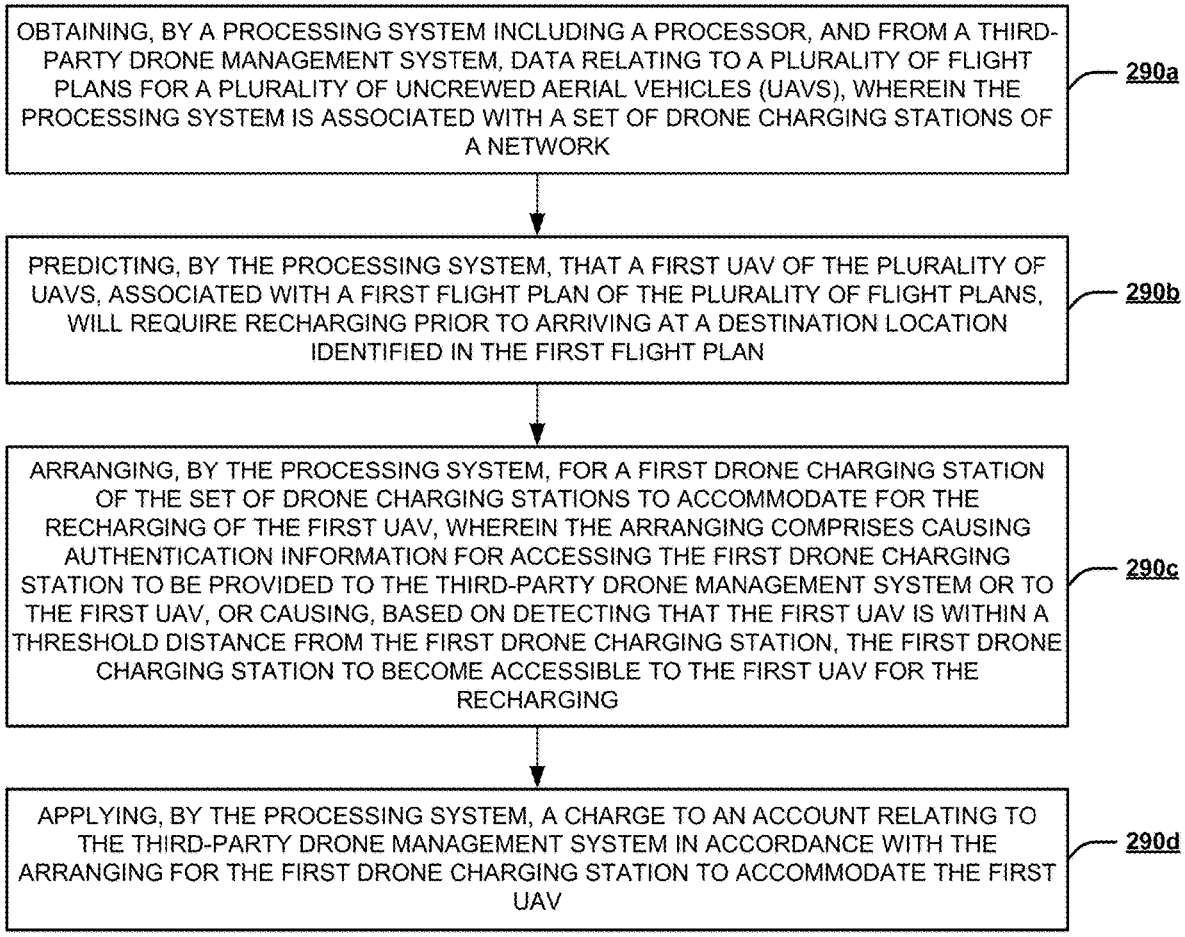
FIG. 2E depicts an illustrative embodiment of a method in accordance with various aspects described herein.

FIG. 2E depicts an illustrative embodiment of a method 290 in accordance with various aspects described herein. In some embodiments, one or more process blocks of FIG. 2E can be performed by a routing/orchestration platform, such as the routing/orchestration platform 218. In some embodiments, one or more process blocks of FIG. 2E may be performed by another device or a group of devices separate from or including the routing/orchestration platform 218, such as edge system 214a, 214b, and/or 214c, base station 212a, 212b, and/or 212c, docking/charging station 240a, 240b, and/or 240c, core network 210, external network/cloud 211, UAV(s) 220, or user device(s) 216.

At 290a, the method can include obtaining, by a processing system including a processor, and from a third-party drone management system, data relating to a plurality of flight plans for a plurality of uncrewed aerial vehicles (UAVs), wherein the processing system is associated with a set of drone charging stations of a network. For example, the routing/orchestration platform 218 can obtain, from a third-party drone management system, data relating to a plurality of flight plans for a plurality of uncrewed aerial vehicles (UAVs) in a manner similar to that described above with respect to the system 200 of FIG. 2A, where the routing/orchestration platform 218 is associated with a set of drone charging stations of a network.

At 290b, the method can include predicting, by the processing system, that a first UAV of the plurality of UAVs, associated with a first flight plan of the plurality of flight plans, will require recharging prior to arriving at a destination location identified in the first flight plan. For example, the routing/orchestration platform 218 can predict that a first UAV of the plurality of UAVs, associated with a first flight plan of the plurality of flight plans, will require recharging prior to arriving at a destination location identified in the first flight plan in a manner similar to that described above with respect to the system 200 of FIG. 2A.

At 290c, the method can include arranging, by the processing system, for a first drone charging station of the set of drone charging stations to accommodate for the recharging of the first UAV, wherein the arranging comprises causing authentication information for accessing the first drone charging station to be provided to the third-party drone management system or to the first UAV, or causing, based on detecting that the first UAV is within a threshold distance from the first drone charging station, the first drone charging station to become accessible to the first UAV for the recharging. For example, the routing/orchestration platform 218 can arrange for a first drone charging station of the set of drone charging stations to accommodate for the recharging of the first UAV in a manner similar to that described above with respect to the system 200 of FIG. 2A, where the arranging includes causing authentication information for accessing the first drone charging station to be provided to the third-party drone management system or to the first UAV, or causing, based on detecting that the first UAV is within a threshold distance from the first drone charging station, the first drone charging station to become accessible to the first UAV for the recharging.

At 290d, the method can include applying, by the processing system, a charge to an account relating to the third-party drone management system in accordance with the arranging for the first drone charging station to accommodate the first UAV. For example, the routing/orchestration platform 218 can apply a charge to an account relating to the third-party drone management system in accordance with the arranging for the first drone charging station to accommodate the first UAV in a manner similar to that described above with respect to the system 200 of FIG. 2A.

In some implementations of these embodiments, the arranging further comprises authenticating an application programming interface (API) request based on network data, where the network data includes one or more unique radio equipment identifiers, data regarding signal measurements, or a combination thereof.

In some implementations of these embodiments, a particular UAV, not included in the plurality of UAVs, resides at the first drone charging station as a home location of the particular UAV, wherein the arranging further comprises causing the particular UAV to dispatch from the first drone charging station to permit accommodation of the first UAV.

In some implementations of these embodiments, the predicting that the first UAV will require the recharging is based on a determined distance between a starting location of the first UAV and the destination location, a weather condition in a geographic region between the starting location and the destination location, a model of the first UAV, a type of the first UAV, a manufacturer of the first UAV, a capability of the first UAV, a battery status or battery type of the first UAV, or a combination thereof, and the arranging is based on availability of individual drone charging stations in the set of drone charging stations, connectivity of the first UAV to the network, or a combination thereof.

While for purposes of simplicity of explanation, the respective processes are shown and described as a series of blocks in FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
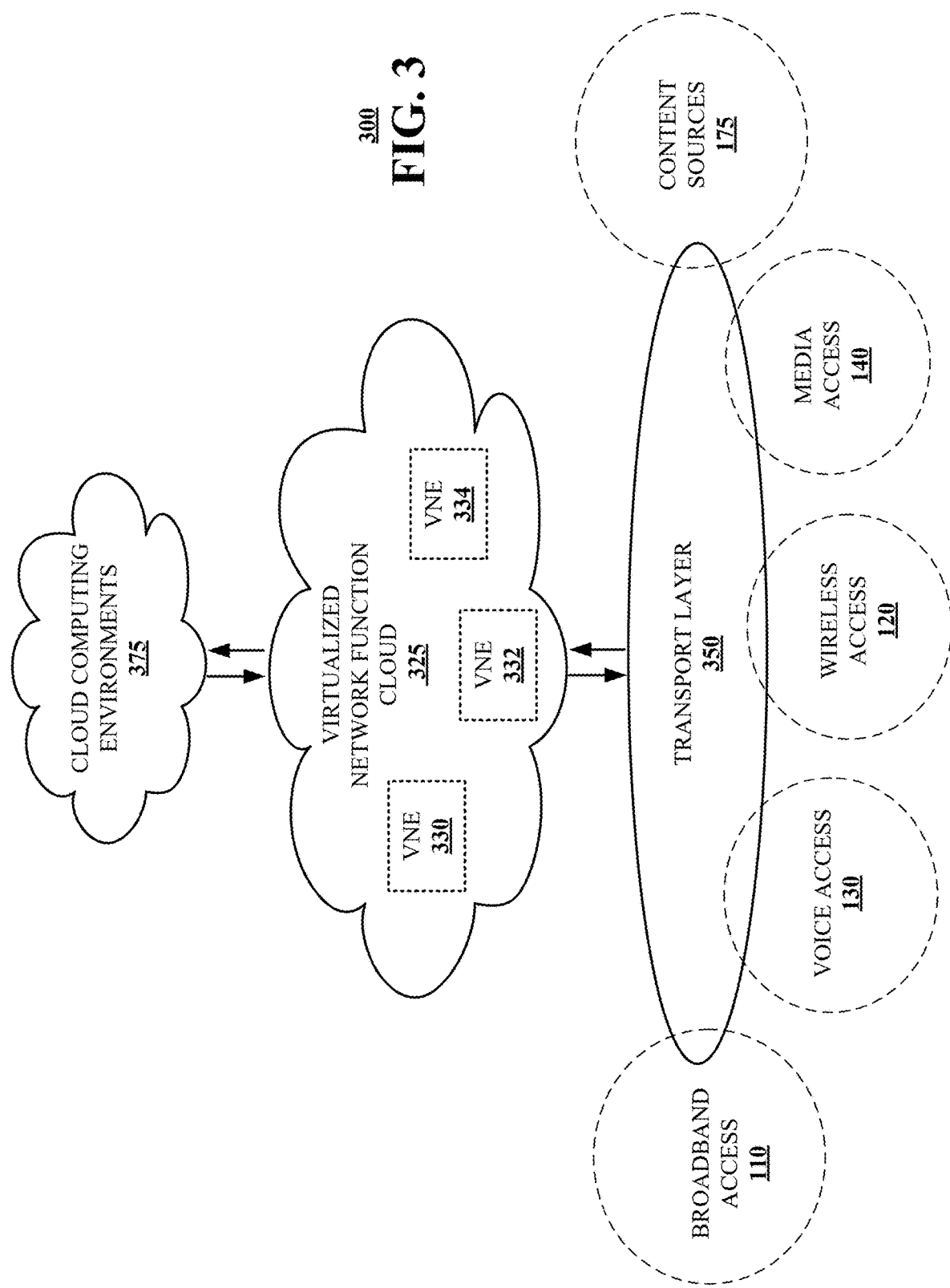
FIG. 3 is a block diagram illustrating an example, non-limiting embodiment of a virtualized communications network in accordance with various aspects described herein.

Referring now to FIG. 3, a block diagram 300 is shown illustrating an example, non-limiting embodiment of a virtualized communications network in accordance with various aspects described herein. In particular, a virtualized communications network is presented that can be used to implement some or all of the subsystems and functions of system 100, the subsystems and functions of system 200, and methods 280, 285, and 290 presented in FIGS. 1 and 2A-2E. For example, virtualized communications network 300 can facilitate, in whole or in part, autonomous routing, orchestration, and/or management of UAVs and/or data on a network (e.g., as described herein with respect to at least FIG. 2A).

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communications network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic. In this way, the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
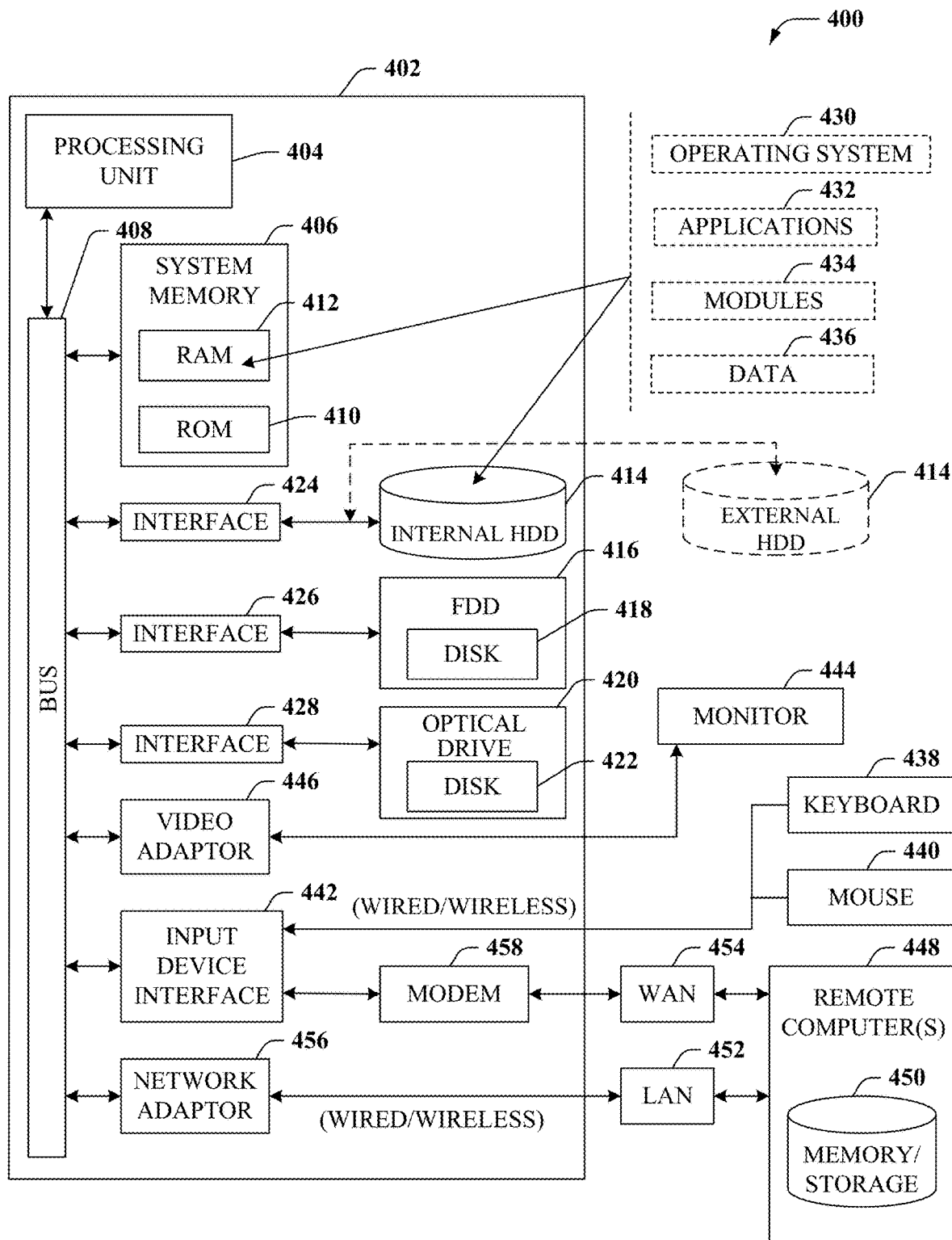
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate, in whole or in part, autonomous routing, orchestration, and/or management of UAVs and/or data on a network (e.g., as described herein with respect to at least FIG. 2A).

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communications network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out, anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
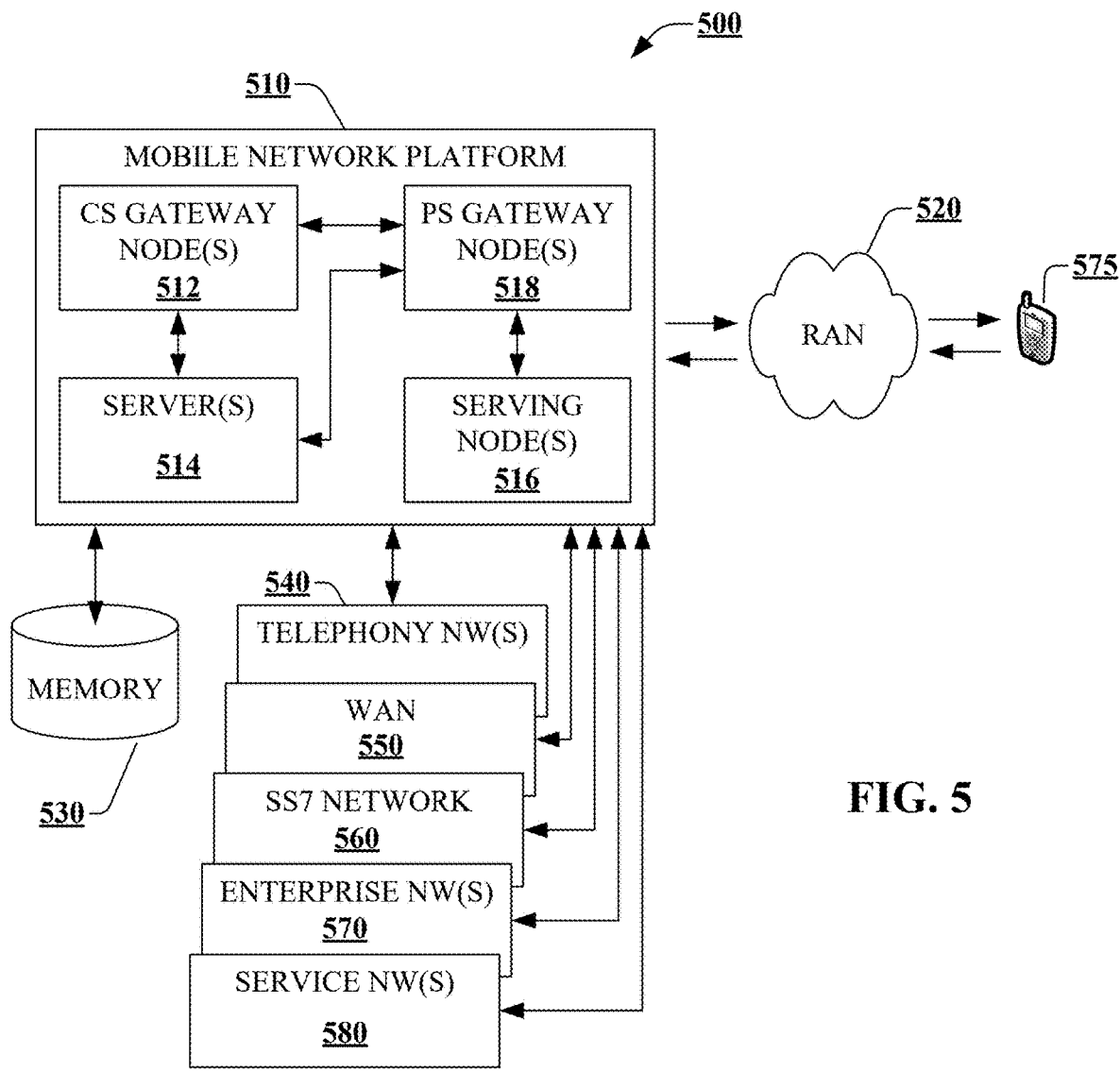
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate, in whole or in part, autonomous routing, orchestration, and/or management of UAVs and/or data on a network (e.g., as described herein with respect to at least FIG. 2A). In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology (ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as distributed antenna networks that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
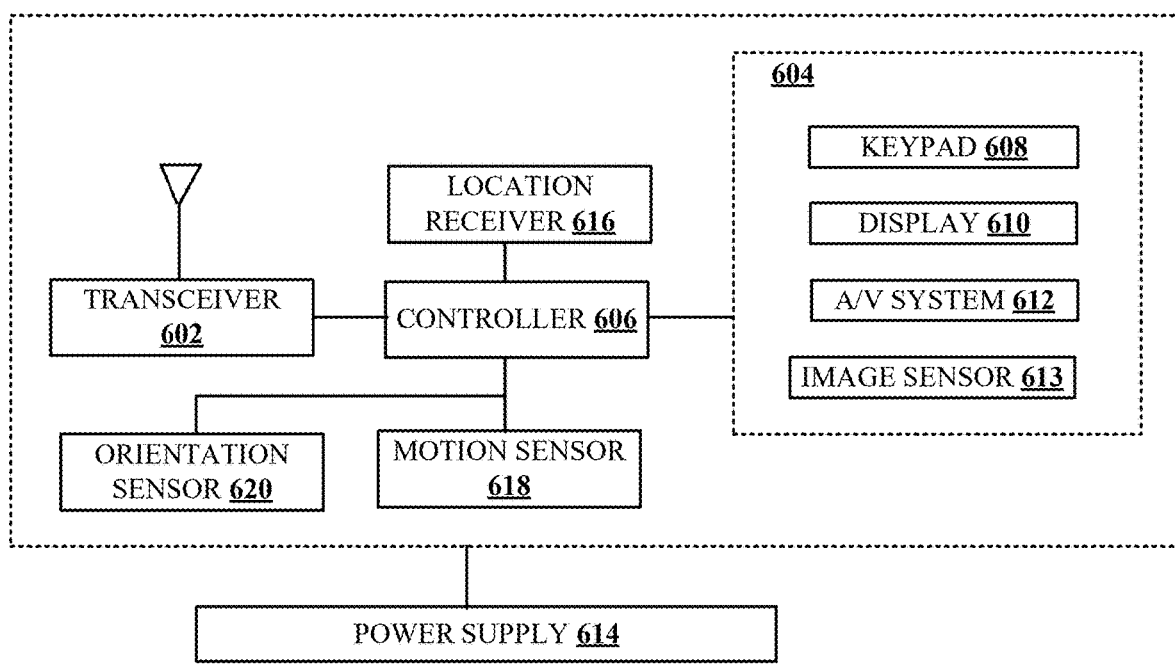
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate, in whole or in part, autonomous routing, orchestration, and/or management of UAVs and/or data on a network (e.g., as described herein with respect to at least FIG. 2A).

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communications network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communications network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
  a processing system of a network including a processor; and
  a memory that stores executable instructions that, when executed by the processing system, facilitate performance of operations, the operations comprising:
    identifying an uncrewed aerial vehicle (UAV) for route planning and power management;
    obtaining information regarding a power source of the UAV, a present location of the UAV, and a destination location for the UAV;
    determining, based on the information, a need for the UAV to recharge the power source of the UAV as part of a journey of the UAV from the present location of the UAV to the destination location for the UAV;
    responsive to the determining the need, identifying a recharging station associated with the network for recharging the power source of the UAV, wherein the recharging station comprises an enclosure, and wherein the enclosure comprises an interior portion and an ingress mechanism that, when in an open position, enables the UAV to enter into the interior portion;
    calculating a flight path for the UAV in accordance with the identifying the recharging station; and
    based on the calculating:
      generating first instructions that cause the UAV to travel to the recharging station,
      prior to an arrival of the UAV to the recharging station, generating second instructions that cause a different UAV that is assigned to the recharging station as a home station and that is disposed within the interior portion of the enclosure to vacate the interior portion of the enclosure to allow the UAV to be accommodated by the recharging station, and
      based on a type and capability of the different UAV, identifying one or more other recharging stations to direct the different UAV;
    routing the different UAV to one of the one or more other recharging stations;

causing the recharging station to set the ingress mechanism to the open position when the UAV is determined to be within a threshold distance from the recharging station, thereby enabling the UAV to enter into the interior portion of the enclosure for the recharging of the power source of the UAV.

2. The device of claim 1, wherein the information identifies a distance between the present location of the UAV and the destination location for the UAV, a weather condition in a geographic region between the present location of the UAV and the destination location for the UAV, a model of the UAV, a type of the UAV, a manufacturer of the UAV, a capability of the UAV, a battery status or battery type of the UAV, a remaining distance that the UAV is able to travel as estimated by the UAV based on determined battery status, or a combination thereof.

3. The device of claim 1, wherein the UAV is included in a fleet of UAVs associated with an operator of the network.

4. The device of claim 1, wherein the UAV is included in a fleet of UAVs associated with a third-party entity.

5. The device of claim 1, wherein the processing system is configured to allow for accessing of functionalities relating to the route planning and the power management.

6. The device of claim 5, wherein the operations further comprise receiving a request from a third-party entity for the route planning and the power management, and wherein the identifying the UAV is based on the request.

7. The device of claim 1, wherein the ingress mechanism comprises a cover, a lid, a door, or a gate.

8. The device of claim 1, wherein the recharging station is included in a set of recharging stations associated with the network, and wherein each recharging station in the set of recharging stations is configured to accommodate UAVs of different types and different capabilities.

9. The device of claim 1, wherein the recharging station is mounted on a cell tower associated with the network.

10. The device of claim 1, wherein the recharging station is located within a coverage area associated with the network.

11. A non-transitory machine-readable medium, comprising executable instructions that, when executed by a processing system of a network including a processor, facilitate performance of operations, the operations comprising:

identifying an uncrewed aerial vehicle (UAV) for route planning and power management;

receiving information regarding a power source of the UAV, a present location of the UAV, and a destination location for the UAV;

determining, based on the information, a need for the UAV to recharge the power source of the UAV as part of a journey of the UAV from the present location of the UAV to the destination location for the UAV;

responsive to the determining the need, identifying a recharging station associated with the network for recharging the power source of the UAV, wherein the recharging station comprises an enclosure, and wherein the enclosure comprises an interior portion and an ingress mechanism that, when in an open position, enables the UAV to enter into the interior portion;

calculating a flight path for the UAV in accordance with the identifying the recharging station; and based on the calculating:
generating first instructions that cause the UAV to travel to the recharging station,
prior to an arrival of the UAV to the recharging station, generating second instructions that cause a different UAV that is assigned to the recharging station as a home station and that is disposed within the interior portion of the enclosure to vacate the interior portion of the enclosure to allow the UAV to be accommodated by the recharging station, and
based on a type and capability of the different UAV, identifying one or more other recharging stations to direct the different UAV;
routing the different UAV to one of the one or more other recharging stations;
causing the recharging station to set the ingress mechanism to the open position when the UAV is determined to be within a threshold distance from the recharging station, thereby enabling the UAV to enter into the interior portion of the enclosure for the recharging of the power source of the UAV.

12. The non-transitory machine-readable medium of claim 11, wherein the information identifies a distance between the present location of the UAV and the destination location for the UAV, a weather condition in a geographic region between the present location of the UAV and the destination location for the UAV, a model of the UAV, a type of the UAV, a manufacturer of the UAV, a capability of the UAV, a battery status or battery type of the UAV, a remaining distance that the UAV is able to travel as estimated by the UAV based on determined battery status, or a combination thereof.

13. The non-transitory machine-readable medium of claim 11, wherein the UAV is included in a fleet of UAVs associated with an operator of the network.

14. The non-transitory machine-readable medium of claim 11, wherein the UAV is included in a fleet of UAVs associated with a third-party entity.

15. The non-transitory machine-readable medium of claim 11, wherein the processing system is configured to allow for accessing of functionalities relating to the route planning and the power management.

16. A method, comprising:
identifying, by a processing system of a network including a processor, an uncrewed aerial vehicle (UAV) for route planning and power management;
obtaining, by the processing system, information regarding a power source of the UAV, a present location of the UAV, and a destination location for the UAV;
determining, by the processing system and based on the information, a need for the UAV to recharge the power source of the UAV as part of a journey of the UAV from the present location of the UAV to the destination location for the UAV;
responsive to the determining the need, identifying, by the processing system, a recharging station associated with the network for recharging the power source of the UAV, wherein the recharging station comprises an enclosure, and wherein the enclosure comprises an interior portion and an ingress mechanism that, when in an open position, enables the UAV to enter into the interior portion;
obtaining, by the processing system, a flight path for the UAV in accordance with the identifying the recharging station; and
based on the obtaining the flight path:
generating first instructions that cause, by the processing system, the UAV to travel to the recharging station,
prior to an arrival of the UAV to the recharging station, generating second instructions that cause, by the processing system, a different UAV that is assigned to the recharging station as a home station and that is disposed within the interior portion of the enclosure to vacate the interior portion of the enclosure to allow the UAV to be accommodated by the recharging station, and based on a type and capability of the different UAV, identifying, by the processing system, one or more other recharging stations to direct the different UAV;

routing, by the processing system, the different UAV to one of the one or more other recharging stations;

causing, by the processing system, the recharging station to set the ingress mechanism to the open position when the UAV is determined to be within a threshold distance from the recharging station, thereby enabling the UAV to enter into the interior portion of the enclosure for the recharging of the power source of the UAV.

17. The method of claim 16, wherein the information identifies a distance between the present location of the UAV and the destination location for the UAV, a weather condition in a geographic region between the present location of the UAV and the destination location for the UAV, a model of the UAV, a type of the UAV, a manufacturer of the UAV, a capability of the UAV, a battery status or battery type of the UAV, a remaining distance that the UAV is able to travel as estimated by the UAV based on determined battery status, or a combination thereof.

18. The method of claim 16, wherein the UAV is included in a fleet of UAVs associated with an operator of the network.

19. The method of claim 16, wherein the UAV is included in a fleet of UAVs associated with a third-party entity.

20. The method of claim 16, wherein the processing system is configured to allow for accessing of functionalities relating to the route planning and the power management.

* * * * *